(12) United States Patent
Tanaka et al.

(10) Patent No.: US 7,927,668 B2
(45) Date of Patent: Apr. 19, 2011

(54) COATER OF ELECTRIC INSULATING SHEET AND METHOD FOR PRODUCING ELECTRIC INSULATING SHEET WITH COATED FILM

(75) Inventors: Harumi Tanaka, Otsu (JP); Yutaka Nishimori, Kyoto (JP); Hiroyuki Inoue, Otsu (JP)

(73) Assignee: Toray Industries, Inc., Tokyo (JP)

( * ) Notice: Subject to any disclaimer, the term of this patent is extended or adjusted under 35 U.S.C. 154(b) by 796 days.

(21) Appl. No.: 11/911,315

(22) PCT Filed: Apr. 5, 2006

(86) PCT No.: PCT/JP2006/307208
§ 371 (c)(1),
(2), (4) Date: Oct. 11, 2007

(87) PCT Pub. No.: WO2006/109644
PCT Pub. Date: Oct. 19, 2006

(65) Prior Publication Data
US 2009/0324842 A1 Dec. 31, 2009

(30) Foreign Application Priority Data
Apr. 12, 2005 (JP) .................. 2005-114313

(51) Int. Cl.
*B05D 1/04* (2006.01)
*B05C 1/04* (2006.01)
(52) U.S. Cl. ........ 427/482; 427/420; 118/638; 118/407; 118/419
(58) Field of Classification Search .................. 427/420, 427/482; 118/407, 419, 638
See application file for complete search history.

(56) References Cited

U.S. PATENT DOCUMENTS

| 4,513,683 A | * | 4/1985 | Kisler ............................ 118/620 |
| 2003/0059548 A1 | * | 3/2003 | Zaretsky et al. ............... 427/420 |
| 2005/0030694 A1 | | 2/2005 | Morioka et al. |

FOREIGN PATENT DOCUMENTS

| EP | 1 503 614 A2 | | 2/2005 |
| JP | 2597237 B | | 4/1997 |
| JP | 09-253565 A | | 9/1997 |
| JP | 10-259328 A | | 9/1998 |
| JP | 2817056 B | | 10/1998 |
| JP | 10-314660 A | | 12/1998 |
| JP | 11-128804 A | | 6/1999 |
| JP | 11-156263 | * | 6/1999 |
| JP | 2001-277412 A | | 10/2001 |
| JP | 2004-039421 A | | 2/2004 |

OTHER PUBLICATIONS

Institute of Electrostatics, "Electrostatics Handbook" (with English Partial), Nov. 25, 1998, pp. 179-180 and 319-320, Japan.
International Search Report of Application No. PCT/JP2006/307208 dated May 30, 2006.

* cited by examiner

*Primary Examiner* — Frederick J Parker
(74) *Attorney, Agent, or Firm* — RatnerPrestia

(57) ABSTRACT

A coater for coating an electric insulating sheet with coating liquid while sustaining an identical charging polarity of the insulating sheet and the coating liquid in a process for coating one surface of a traveling electric insulating sheet with coating liquid, and a method for producing a coated electric insulating sheet. In order to sustain an identical charging polarity of the insulating sheet and the coating liquid, the coater comprises any one or both of a sheet charger for imparting electrostatic charges to one surface of the electric insulating sheet and a coating liquid charger for imparting electrostatic charges to the coating liquid.

21 Claims, 10 Drawing Sheets

COATER OF ELECTRIC INSULATING SHEET AND METHOD FOR PRODUCING ELECTRIC INSULATING SHEET WITH COATED FILM

This is a U.S. National Phase Application of application number PCT/JP2006/307208filed Apr. 5, 2006, the entire disclosure of which is expressly incorporated by reference herein.

TECHNICAL FIELD

The invention relates to a coating apparatus for an electrical insulating sheet and a method for producing an electrical insulating sheet having a coated film on a surface thereof.

BACKGROUND ART

With good characteristics in terms of heat resistance, chemical resistance, and mechanical characteristics, electrical insulating sheets, such as polyester film, in recent years, have been used in many fields including magnetic recording material, various types of photographic material, electrical insulation material, and various types of release paper. In some cases, special surface characteristics are required for specific uses, and various coating layers (coated film) are provided on a surface of such sheets to meet these requirements. For example, coating liquids including magnetic coatings, ink coatings, lubricating coatings, releasing coatings, and hard coatings are applied over the surface of the sheets to produce a thin coat layer of these materials.

Coating apparatuses that comprise a coating bar, gravure roll, die, etc. are known as means to apply a coating liquid on a surface of electrical insulating sheets that are traveling continuously. In these coating apparatuses, a coating liquid is applied to a surface of the sheet while being weighed so that the thickness of the coating liquid applied to the traveling sheet will be in a predetermined range. In a coating bar type apparatus, for example, a coating liquid is supplied onto the traveling sheet, and the amount of the coating liquid is measured with a coating bar while removing the excess liquid, followed by smoothing the surface to adjust the thickness to a predetermined range. In such coating liquid application processes, a "liquid pool" of the coating liquid, which can be small or large as the case may be, forms in the neighborhood of the coating or smoothing means. For example, such a "liquid pool" can form in the gap between the coating bar and a portion of the surface of the sheet on the upstream side from the coating bar.

The liquid pool is also called meniscus. The shape of a liquid pool relates to the viscosity and the surface tension of the coating liquid. When a coating liquid is applied to a sheet, there will be an optimum range for the shape of the sheet (in terms of size, uniformity in the sheet's width direction, etc.). If a force is exerted to the liquid pool in the sheet's traveling direction, it will allow the coating liquid to be applied more uniformly on the sheet as a result of the coating liquid's adhesion to the sheet.

If the liquid pool is in an unstable state, however, some portions in the surface of the sheet may be left uncoated with the coating liquid, or streak-like defects may result from uneven coating in some cases. When using a coating bar, for example, it will be difficult to apply a coating liquid having a relatively high viscosity on an electrical insulating sheet.

Such an unstable state of the liquid pool can result from electrification of the electrical insulating coating liquid. In a charged coating liquid, each particle that constitutes the coating liquid is charged, and all these particles have the same polarity when charged. Thus a Coulomb's force is generated among the particles, resulting in repulsion among them. If there is a large repulsive Coulomb's force, a bumping-like state will be caused in the coating liquid in the liquid pool, making the shape of the liquid pool unstable. When particles repulse each other, furthermore, air will be easily taken in the coating liquid, making the liquid pool's shape more unstable. If the coating of the surface of the sheet with the coating liquid is performed when the liquid pool's shape is in such an unstable state, the coating liquid applied will not have a uniform thickness, resulting in uneven coating with the coating liquid.

As a conventional means of liquid pool stabilization for prevention of uneven coating with a coating liquid, a space containing the liquid pool is closed for isolation from the outside and depressurized to maintain the liquid pool in a stable shape. However, a coating apparatus that contains such a vacuum space will need a complicated mechanical structure and will have to be very large in size. In particular, such a coating apparatus is not suited for "in-line" use, i.e., incorporation in a process in which thermoplastic resin is melted and processed into a film which is then stretched to produce an electrical insulating sheet.

Such a liquid pool of a coating liquid that forms during the application of the coating liquid is described above. To the best of the inventors' knowledge, there are no conventional methods that can stabilize a liquid pool by using the Coulomb's force actively while controlling the amount of quantity of charge of the coating liquid.

On the other hand, the following methods are conventionally known as coating methods that comprise electrification of or static elimination from an electrical insulating sheet.

A first type coating method: When a coating liquid is supplied continuously on a traveling sheet to produce a coating layer, electrification of the sheet is performed immediately before a coating to accelerate adhesion of the coating liquid to the sheet.

A second type coating method: When a coating liquid is supplied continuously on a traveling sheet to produce a coating layer, static elimination from the sheet is performed immediately before a coating to ensure that disturbance of adhesion of the coating liquid to the sheet is prevented to control uneven coating.

The first type coating method, which aims to improve the wettability of a surface of an electrical insulating sheet, is disclosed in Patent document 1 or Patent document 2. Specifically, the first type coating method uses conventionally known corona discharge treatment to introduce polar functional groups in the coated surface of the electrical insulating sheet in order to ensure an optimum wettability by increasing the surface tension of the electrical insulating sheet. Thus, the electrical insulating sheet will be charged at the same time, resulting in the phenomenon of sheet's electrification.

An apparatus for the corona discharge treatment comprises a discharging electrode such as a wire that is provided on the sheet's coated surface side to cause corona discharge, and an grounding roll that is contact with the sheet's surface opposite to the coated surface to support the traveling of the sheet. The grounding roll acts as shield electrode (or grounded electrode, grounded counter electrode) to assist the corona discharge, adjusting the potential on the rear side of the electrical insulating sheet to 0V. The configuration of the corona discharge treatment apparatus is disclosed in Patent document 2.

FIG. 15 gives a schematic side view of a coating apparatus 150 having a corona discharge treatment apparatus 151 that is disclosed in Patent document 2. In FIG. 15, the coating apparatus 150 has the corona discharge treatment apparatus 151 and a coating liquid supply apparatus 155 in the direction from the upstream side to the downstream side in a traveling direction PSD of an electrical insulating sheet PS. The coating liquid supply apparatus 155 includes a discharging means 156 for the coating liquid PC and a pump 157 for supplying a coating liquid PC to the discharging means 156. Opposed to the discharging means 156, there is a backup roll 158 that is in contact with a surface PS2 of the sheet PS that is opposite to a coating surface PS1. The coating liquid PC is discharged from the discharging means 156 to the coating surface PS1 of the sheet PS, and applied to the coating surface PS1. A liquid pool PCP of the coating liquid PC is formed between the coating surface PS1 and the discharging means 156. The coating liquid PC which has been applied to the coating surface PS1 forms a coating layer PCL on the coating surface PS1.

The corona discharge treatment apparatus 151 comprises a grounded counter electrode roll 152 that is in contact with the surface PS2 opposite to the coating surface PS1 of the sheet PS, and a corona discharge electrode 153 that is opposed to the grounded counter electrode roll 152 and situated on the side of the coating surface PS1 of the sheet PS with a gap from the coating surface PS1. The corona discharge electrode 153 is connected to a corona discharge treatment power supply 154.

The electrical insulating sheet PS is kept in contact with the grounded counter electrode roll 152 as it is conveyed in the traveling direction PSD. The grounded counter electrode roll 152 serves to allow the opposite surface PS2 to the coating surface PS1 of the sheet PS to have a potential of 0V. As the sheet PS passes between the corona discharge electrode 153 and the grounded counter electrode roll 152, the sheet PS is exposed to a corona discharge space that contains a large amount of ions and radicals, and polar functional groups are introduced in the surface of the sheet PS. During this process, the sheet PS is charged at the same time. This treatment allows the surface of the sheet PS to have a high wettability, and the attractive force generated by the electrostatic charge serves to enhance adhesion of the coating liquid PC to the sheet PS.

Patent document 2 has no concrete description about the polarity of the charged coating liquid, but the proposed method uses the attractive force resulting from electrification, suggesting that the method only aims to allow the electrical insulating sheet PS and the coating liquid PC to have opposite polarities, or respectively have a potential of 0V and either positive or negative polarity, to cause an attracting Coulomb's force. To the best of the inventors' knowledge, this method cannot serve to stabilize the shape of the liquid pool PCP.

The second type coating method, on the other hand, is disclosed in Patent document 3 or Patent document 4. The conventional method, however, cannot perform sufficient static elimination from the surfaces of the electrical insulating sheet, and therefore cannot eliminate uneven coating resulting from the electrification of the electrical insulating sheet.

A static elimination apparatuses based on conventional technology uses a static eliminator that uses the generally known corona discharge. Such static eliminators include self-discharge type static eliminators in which a grounded brush-like conductor comes close to an charged electrical insulating sheet so that corona discharge will take place at the end of the brush to achieve static elimination; and alternating current type and direct current type voltage-applying static eliminators in which a commercial-frequency high voltage or a direct-current high voltage is applied to a needle-like electrode to cause corona discharge which is used for static elimination. Conventional static elimination methods that use corona discharge are designed to allow the resulting positive and negative ions to be attracted by the Coulomb's force caused by the positive and negative charges on the electrical insulating sheet, followed by equilibration with the positive and negative charges to achieve the neutralization of the charges on the sheet.

However, if positively and negatively charged portions coexist, close to each other, on the electrical insulating sheet, the electric force lines formed by the charges will be closed among the charged portions with opposite polarities. At somewhat distant portions, therefore, the intensity of the electric field will be so small that it will be impossible to attract necessary ions from the static eliminator, making it difficult to eliminate positive and negative electrostatic charges from the sheet.

Similarly, if the two surfaces of the electrical insulating sheet have opposite polarities, making the sheet apparently non-charged, the electric force lines formed by the electrostatic charges will be closed among the oppositely charged portions existing on the opposite surfaces of the sheet. Therefore, it will be impossible to attract necessary ions from the static eliminator. Conventional static eliminators cannot be useful for static elimination before coating if positively and negatively charged portions coexist. For a charged sheet having the two surfaces charged oppositely to the equivalent degree, it was impossible to achieve sufficient static elimination from these surfaces, failing to prevent uneven coating completely.

For control of the charge of the coating liquid, on the other hand, Patent document 5 has disclosed a method in which a charge feed apparatus is provided in the coating liquid supply pipe to remove static charges from the charged coating liquid or to charge the coating liquid oppositely before coating. FIG. 16 schematically shows a longitudinal section that describes the technique disclosed in the Patent document 5.

In FIG. 16, a charge feed apparatus 161 comprises a coating liquid supply pipe 162*a*, an electrode tube 164 provided via an insulator 163 with a gap from the coating liquid supply pipe 162*a*, and an insulator 165 provided outside the electrode tube 164 to protect the electrode tube 164, and a high voltage power supply 166. The coating liquid supply pipe 162*a* constitutes a part of a coating liquid supply piping 162. A high voltage is applied to the electrode tube 164 from the high voltage power supply 166. A high voltage of 4 kV is applied to the electrode tube 164 in an example given in Patent document 5. A charge is induced in the coating liquid supply pipe 162*a* when a high voltage is applied to the electrode tube 164.

In this electrification apparatus, however, the electrode tube 45 is not in contact with the coating liquid, making it impossible to feed a charge into the coating liquid. So, the amount of quantity of charge of the coating liquid is low though a high voltage is applied. It was impossible to charge the coating liquid to a sufficient level at a low coating liquid flow rate although it was possible to remove the charge from the charged coating liquid. This indicates that the charge feed apparatus 161 disclosed in Patent document 5 is not an efficient electrification apparatus for electrification of an electrical insulating coating liquid when used in equipment designed to coat a continuously traveling electrical insulating sheet.

As described above, no techniques are currently available that can stabilize a liquid pool easily without making the coating apparatus complicated, and conventional techniques cannot eliminate the problem of uneven coating resulting from the instability of the liquid pool. In particular, the liquid pool tends to be unstable, making the coating uneven, if the coating liquid is an electrical insulating liquid having a high viscosity. In addition, electrification of the electrical insulating sheet also acts to cause uneven coating. It has been impossible, furthermore, to supply an electrical insulating coating liquid to a coating apparatus after efficiently charging the liquid.

Patent document 1: JP 11-128804 A
Patent document 2: JP 2597237 B
Patent document 3: JP 10-259328 A
Patent document 4: JP 2817056 B
Patent document 5: JP 9-253565 A
Patent document 6: JP 2004-39421 A
Patent document 7: US 2005/0030694 A1
Non-patent document 1: Electrostatics Handbook; ed. Institute of Electrostatics Japan; pub. Ohmsha, Ltd.; p. 319
Non-patent document 2: Electrostatics Handbook; ed. Institute of Electrostatics Japan; pub. Ohmsha, Ltd.; p. 179

DISCLOSURE OF THE INVENTION

Problem to be Solved by the Invention

By solving the above-mentioned problems in the conventional techniques, the invention aims to provide a coating apparatus in which a liquid pool formed in a gap between an electrical insulating sheet and a coating liquid supply apparatus or a coating layer smoothing apparatus is stabilized to prevent uneven coating when applying a coating liquid on a first surface of a traveling electrical insulating sheet, and to provide a method for producing an electrical insulating sheet having a coated film.

Means of Solving the Problem

A coating apparatus of the invention to solve the above-mentioned problems is as follows.

A coating apparatus to apply a coating liquid on a first surface of an electrical insulating sheet traveling in a predetermined traveling direction which comprises a sheet charging apparatus that supplies a charge to the first surface and a first surface coating liquid supply apparatus that is provided downstream in the traveling direction from the sheet charging apparatus to supply the coating liquid to the first surface, wherein the sheet charging apparatus supplies the first surface with a charge having the same polarity as that of the coating liquid while the coating liquid is supplied to the first surface from the first surface coating liquid supply apparatus. This coating apparatus is hereafter referred to as a first embodiment of the coating apparatus.

A coating apparatus to apply a coating liquid on a first surface of an electrical insulating sheet traveling in a predetermined traveling direction which comprises a first surface coating liquid supply apparatus that supplies the coating liquid to the first surface and a coating liquid charging apparatus that supplies a charge to the coating liquid before being supplied to the first surface, wherein the coating liquid charging apparatus supplies the coating liquid with a charge having the same polarity as that of the first surface while the coating liquid is being supplied to the first surface from the first surface coating liquid supply apparatus. This coating apparatus is hereafter referred to as a second embodiment of the coating apparatus.

A coating apparatus to apply a coating liquid on a first surface of an electrical insulating sheet traveling in a predetermined traveling direction which comprises a sheet charging apparatus to supply a charge having a predetermined polarity to the electrical insulating sheet, a first surface coating liquid supply apparatus that supplies the coating liquid to the first surface, and a coating liquid charging apparatus that supplies a charge having the same polarity as the predetermined polarity to the coating liquid before the coating liquid is supplied to the first surface. This coating apparatus is hereafter referred to as a third embodiment of the coating apparatus.

A coating apparatus as defined in the first, second or third embodiment of the coating apparatus, wherein a second surface coating liquid supply apparatus is provided upstream in the traveling direction from the first surface coating liquid supply apparatus and a coating liquid having a volume resistivity of $10^9$ [$\Omega \cdot cm$] or less is applied from the second surface coating liquid supply apparatus to a second surface of the electrical insulating sheet.

A coating apparatus as defined in the first, second or third embodiment of the coating apparatus, wherein a second surface coating liquid supply apparatus is provided upstream in the traveling direction from the first surface coating liquid supply apparatus and a water-containing coating liquid is supplied from the second surface coating liquid supply apparatus to the second surface of the electrical insulating sheet.

In the first, second or third embodiment of the coating apparatus, it is preferable that a first surface coating layer smoothing apparatus is provided downstream in the traveling direction from the first surface coating liquid supply apparatus to smooth out the coating liquid supplied to the first surface from the first surface coating liquid supply apparatus for forming a coating layer having a predetermined coating thickness.

It is preferable that the first surface coating layer smoothing apparatus is a coating layer smoothing apparatus comprising a coating bar system, a gravure roll coater system or die system. It is preferable that the first surface is positioned in the upper side in the direction of the gravitational force. It is preferable that the coating liquid is supplied in the direction at right angles to both the traveling direction and the normal to the electrical insulating sheet to the first surface from the first surface coating liquid supply apparatus. It is preferable that the first surface coating layer smoothing apparatus is the coating layer smoothing apparatus comprising the coating bar system.

In the first or third embodiment of the coating apparatus, it is preferred that the sheet charging apparatus has one or more charging units, each of the charging units includes a first electrode unit provided in the side of the first surface of the electrical insulating sheet and a second electrode unit provided in the side of a second surface of the electrical insulating sheet, both of which are positioned on opposite sides of the electric insulating sheet, the first electrode unit has a first ion generation electrode and the second electrode unit has a second ion generation electrode, and wherein the electricity applied to the first ion generation electrode and that to the second ion generation electrode are direct currents having substantially the opposite polarities to each other.

It is preferable that the first electrode unit has a first shield electrode having an opening located in the neighborhood of the first ion generation electrode and the second electrode has a second shield electrode having an opening located in the neighborhood of the second ion generation electrode.

In the first, second or third embodiment of the coating apparatus, it is preferred that an electrical insulating sheet static elimination apparatus comprising at least two static eliminating units is provided with a distance in the traveling direction between them downstream in the traveling direction from the coating apparatus, each of the static eliminating units includes a third electrode unit provided in the side of the first surface of the electrical insulating sheet and a fourth electrode unit provided in the side of the second surface of the electrical insulating sheet, both of which are positioned on opposite sides of the electrical insulating sheet, the third electrode unit has a third ion generation electrode and a third shield electrode having an opening in the neighborhood of the tip of the third ion generation electrode, the fourth electrode unit has a fourth ion generation electrode and a fourth shield electrode having an opening in the neighborhood of the tip of the fourth ion generation electrode, and wherein the electricity applied to the third ion generation electrode and that to the fourth ion generation electrode are alternating currents having substantially opposite polarities to each other.

In the second or third embodiment of the coating apparatus, it is preferred that the first surface coating liquid supply apparatus includes a storage tank that stores the coating liquid, a discharging means that discharges the coating liquid to the first surface, a pump that supplies the coating liquid from the storage tank to the discharging means, and a coating liquid supply pipe that conveys the coating liquid between the storage tank, the discharging means and the pump, and wherein the coating liquid supply pipe is applied a potential having the opposite polarity to that of the first surface when the coating liquid is being supplied to the first surface.

A method for producing an electrical insulating sheet having a coated film of the invention to solve the above-mentioned problems is as follows.

A method for producing an electrical insulating sheet having a coated film which comprises applying a coating liquid on a first surface of an electrical insulating sheet traveling in a predetermined traveling direction and forming a coated film on the first surface which comprises the coating liquid applied on the first surface, wherein a polarity of the first surface and a polarity of the coating liquid are adjusted in the same polarity when the coating liquid is being applied on the first surface. This method for producing an electrical insulating sheet having a coated film is hereafter referred to a first embodiment of the method for producing an electrical insulating sheet having a coated film.

A method for producing an electrical insulating sheet having a coated film which comprises applying a coating liquid on a first surface of an electrical insulating sheet traveling in a predetermined traveling direction and forming a coated film on the first surface which comprises the coating liquid applied on the first surface, wherein charging forcedly the first surface with the same polarity as that of the coating liquid before the coating liquid is applied on the first surface. This method for producing an electrical insulating sheet having a coated film is hereafter referred to a second embodiment of the method for producing an electrical insulating sheet having a coated film.

A method for producing an electrical insulating sheet having a coated film which comprises applying a coating liquid on a first surface of an electrical insulating sheet traveling in a predetermined traveling direction and forming a coated film on the first surface which comprises the coating liquid applied on the first surface, wherein charging forcedly the coating liquid with the same polarity as that of the first surface before the coating liquid is applied on the first surface. This method for producing an electrical insulating sheet having a coated film is hereafter referred to a third embodiment of the method for producing an electrical insulating sheet having a coated film.

A method for producing an electrical insulating sheet having a coated film which comprises applying a coating liquid on a first surface of an electrical insulating sheet traveling in the predetermined traveling direction and forming a coated film on the first surface which comprises the coating liquid applied on the first surface, wherein charging forcedly the coating liquid and the first surface respectively with the same polarity before the coating liquid is applied on the first surface. This method for producing an electrical insulating sheet having a coated film is hereafter referred to a fourth embodiment of the method for producing an electrical insulating sheet having a coated film.

A method for producing an electrical insulating sheet having a coated film as defined in the first, second, third, or fourth embodiment of the method for producing an electrical insulating sheet having a coated film, wherein a coating liquid having a volume resistivity of $10^9$ [$\Omega \cdot cm$] or less is applied to the second surface of the electrical insulating sheet before the coating liquid is applied on the first surface.

A method for producing an electrical insulating sheet having a coated film as defined in the first, second, third, or fourth embodiment of the method for producing an electrical insulating sheet having a coated film, wherein a water-containing coating liquid is applied on a second surface of the electrical insulating sheet before the coating liquid is applied on the first surface.

A method for producing an electrical insulating sheet having a coated film as defined in the first, second, third, or fourth embodiment of the method for producing an electrical insulating sheet having a coated film, wherein an aerial potential of the electrical insulating sheet is caused to be the same as that of the coating liquid.

A method for producing an electrical insulating sheet having a coated film as defined in the first, second, third, or fourth embodiment of the method for producing an electrical insulating sheet having a coated film, wherein a second surface of the electrical insulating sheet is charged with the opposite polarity to that of the first surface.

In the first, second, third, or fourth embodiment of the method for producing an electrical insulating sheet having a coated film, it is preferred that one or more charging units are provided for the electrical insulating sheet, each charging unit includes a first ion generation electrode provided in the side of the first surface of the electrical insulating sheet and a second ion generation electrode provided in the side of a second surface of the electrical insulating sheet, both of which are provided on the opposite sides of the electrical insulating sheet in the direction of the normal thereto, wherein the electrical insulating sheet is charged by applying a first ion cloud, which is unipolar with its polarity being invariable with time, to the electrical insulating sheet from the first surface side while applying a second ion cloud, which is unipolar with its polarity being substantially opposite to that of the first ion cloud, from the second surface side, simultaneously with the application of the first ion cloud, and the application of ion clouds is achieved by applying a direct current that is invariable with time to the first and second ion generation electrodes.

In the first, second, third, or fourth embodiment of the method for producing an electrical insulating sheet having a coated film, it is preferred that the first surface is subjected to static elimination downstream in the traveling direction after the coating liquid has been applied on the electrical insulating sheet.

For the static elimination from the coated electrical insulating sheet, it is preferred that at least two static eliminating units are provided for the electrical insulating sheet, with a distance in the traveling direction, each static eliminating unit comprises a third ion generation electrode provided in the side of the first surface of the electrical insulating sheet and a fourth ion generation electrode provided in the side of the second surface of the electrical insulating sheet, both of which are provided on the opposite sides of the electrical insulating sheet in the direction of the normal thereto, wherein the electrical insulating sheet is charged by applying a first ion cloud, which is unipolar with its polarity varying with time to the electrical insulating sheet from the first surface side while a second ion cloud, which is unipolar with its polarity being substantially opposite to that of the first ion cloud, from the second surface side, simultaneously with the application of the first ion cloud, and the application of ion clouds is achieved by applying to the third and fourth ion generation electrodes an alternating current whose polarity smoothly changes with time.

In the invention, the term "first surface of the electrical insulating sheet that travels" means one of the two major surfaces of the electrical insulating sheet that will be coated with the coating liquid to form a coating layer. If both surfaces of the electrical insulating sheet are to be coated with the coating liquid to form coating layers, "first surface" refers to the surface that is coated with the coating liquid after the second surface has been coated downstream in the sheet traveling direction.

In the invention, the term "the electrical insulating sheet and the coating liquid have the same polarity." means that the polarity of the apparent charge density of the electrical insulating sheet or that of the rear side equilibrium potential of the surface to be coated with the coating liquid is the same as the polarity of the coating liquid.

The polarity of the coating liquid is defined as that associated with the total of all positive and negative static charges of the coating liquid. Here, $10^{-4}$ [m$^3$] or more and $5 \times 10^{-4}$ [m$^3$] or less of the coating liquid is used to determine the polarity of the coating liquid. For an electrical insulating coating liquid in which positive and negative static charges coexist, the polarity is determined based on the total of the positive and negative static charges regardless of the proportion and distribution of the positive and negative static charges.

In the invention, the term "the coating liquid is substantially non-charged" means that the amount of charges is in the range of $-2 \times 10^{-5}$ to $+2 \times 10^{-5}$ [C/m$^3$] (−2 nC/100 ml to +2 nC/100 ml).

In the invention, the term "electrostatic charge" means the electric charge that is possessed by a substance and that does not vary with time. The substance is in a charged state if it has an electrostatic charge.

In the invention, the term "electrical insulating sheet" means a sheet that has a surface resistivity of $10^9$ [Ω/1×10$^{-2}$ mSq] or more or a volume resistivity of $10^9$ [Ω·cm] or more and that does not conduct electricity efficiently.

In the present description, the term "electrical insulating liquid (coating liquid)" means a liquid (coating liquid) having a volume resistivity of $10^9$ [Ω·cm] or more. The volume resistivity of an electrical insulating liquid (coating liquid) is determined by filling a cube of side 1 cm with the electrical insulating liquid (coating liquid), applying a voltage between opposed two sides, and measuring the electric resistance between the two sides. Practically, a cylindrical electrode and a direct current are used for the measurement. A specimen of the liquid (coating liquid) is poured in a cylindrical electrode that consists of an outer cylinder electrode and an inner cylinder electrode placed in the former, and a direct current of 15V is applied between the outer and inner cylinder electrodes to determine the value of resistance Rv [Ω]. The volume resistivity of ρv [Ω·cm] is calculated from the equation Rv·(2π1)/(ln(r2/r1)), where r1 [cm], r2 [cm], and 1 [cm] denote the radius of the inner cylinder, that of the outer cylinder, and the effective length of the electrode, respectively.

The volume resistivity of an electrical insulating liquid (coating liquid) is obtained in simple by that a 100 ml specimen of the liquid (coating liquid) is spread in an electrical insulating container, and two terminals (diameter 2 mm, length 50 mm) are placed in parallel with an interval of 50 mm. Then, a direct current of 15V is applied between the terminals and the value of resistance [Ω] is measured with a Worksurface Tester manufactured by Simco Japan, Inc.

The "coating bar" as referred to for the invention may be in the form of a rod, wire bar comprising a rod wound with a wire, metering bar, grooved bar produced by grooving a rod, etc.

In cases where a coating liquid etc. is applied to an electrical insulating sheet etc. by a means such as coating apparatus, a pool of the coating liquid is formed in the gap region between the sheet and the coating bar on the upstream side of the coating bar and upstream from the portion where the distance between the sheet and the coating liquid is at a minimum. In the description, the term "liquid pool" means such a pool of the coating liquid. Needless to say, the thin layer of the coating liquid left on the surface of the coating bar or on the surface of the web is not a liquid pool as defined above. Such a thin layer of the coating liquid moves away along with the surface of the coating bar or the web, and is different from the pool of the coating liquid that stays at a fixed position.

In applying a coating liquid, a "liquid pool" whether small or large, is always formed in the neighborhood of the coating means. In a coating bar type apparatus, for example, a "liquid pool" is formed in the upstream-side portion of the gap between the metering bar and the sheet. Such a liquid pool is also called meniscus, bead, or heel.

In the description, the term "stable state of a liquid pool" means a state where the surface shape of the liquid pool does not change largely with time and remain free of periodical vibrations or sudden deformation. In terms of time, it is ideal if the surface shape of the liquid pool remain unchanged all though the sheet coating process. However, long-period fluctuations that do not cause identifiable uneven coating are permissible if the surface shape of the liquid pool remain unchanged for periods of 30 seconds to 3 minutes.

In the description, the term "uniformity of a coating thickness" means the thickness of a coating liquid that is applied continuously in the sheet's traveling direction and across a predominant width in the sheet's width direction. The variation in the coating rate should be so small that the thickness of the coating layer formed is substantially uniform to ensure that any problems will be caused. To achieve a substantially uniform thickness, the variation in the coating thickness should be 30% or less, depending on the required accuracy in coating thickness.

In the description, the term "corona discharge treatment" means a surface treatment method designed to introduce polar functional groups in the surface of an electrical insulating sheet to increase the surface tension and improve the wettability of the sheet's surface. Such surface treatment is achieved by producing a high electric field between a corona discharge electrode and a grounded counter electrode roll to cause corona discharge so that, for example, a discharge space containing a large number of ionized radicals will be formed. If a sheet is exposed to such a discharge space, the sheet's surface will be discharge-treated and polar groups (such as —C=O, —COOH, and —OH) will be introduced in the sheet's surface. The grounded counter electrode roll serves as shield electrode (or grounded electrode, grounded counter electrode) that assists the corona discharge, and the electric potential on the rear side of the sheet will become 0 V.

Here, the wettability is an indicator that shows the ability of a liquid to spread out on the surface of a solid that the liquid cannot penetrate. If the wettability of the solid is high, its surface can be wetted with the liquid. In such cases, the contact angle between the solid surface and the droplet is generally less than 90 degree.

In the description, the term "corona charging" means a process in which positive or negative ions are produced as a result of local dielectric breakdown of air caused by corona discharge and then the ions are allowed to adhere to the surface of an electrical insulating sheet to charge the sheet. Normally, the sheet's surface is not exposed directly to the discharge space, and polar groups are not formed on the sheet's surface. In such cases, therefore, the surface tension of the electrical insulating sheet does not change and the wettability is not improved. In most corona charging apparatuses, a discharging electrode is surrounded by a shielded electrode, and a high voltage is applied to the discharging electrode to cause corona discharge.

In the invention, the term "the first surface of the electrical insulating sheet is charged forcedly with the same polarity as that of the coating liquid" means that the first surface is exposed to ions through "corona electrification" so that the first surface will be charged forcedly with the same polarity as the polarity of the coating liquid.

In the description, the term "traveling path of the electrical insulating sheet" means the predetermined space where the electrical insulating sheet is passed through to undergo electrification or static elimination.

The electrical insulating sheet that is moving through the traveling path can be assumed to be a plane that is free of slack portions. In the invention, the term "direction of the normal to the electrical insulating sheet" means the direction of the normal to such a plane.

In the invention, the term "width direction" means the direction that is at right angles to both the traveling direction of and the normal to the electrical insulating sheet.

In the invention, the term "ions" means charge carriers in different forms such as electrons, atoms that have released or received electrons, charged molecules, molecule clusters, and suspended particulate matters.

In the invention, the term "ion cloud" means an aggregate of ions produced by an ion generation electrode, which is not fixed at a specific position but floats like a cloud while spreading in the space.

In the invention, the term "unipolar ion cloud" means an ion cloud in which ions with either positive or negative polarity account for an overwhelming majority over those with the other polarity. Generally, a positive unipolar ion cloud is formed in the neighborhood of the ion generation electrode if the ion generation electrode has an electric potential with the positive polarity, while a negative unipolar ion cloud is formed in the neighborhood of the ion generation electrode if the ion generation electrode has an electric potential with the negative polarity. However, if the polarity of the ion generation electrode is invert twice or more during the period from the generation of ions in the neighborhood of the ion generation electrode to their arrival at the electrical insulating sheet, both positive and negative ions will coexist between the ion generation electrode and the electrical insulating sheet, and these positive and negative ions will be joined together to decrease the overall ion concentration. In addition, the direction of the Coulomb's force relative to the ions is inverted each time the polarity is inverted, and therefore, the ion cloud to be irradiated to the electrical insulating sheet can no longer unipolar.

In the invention, the term "ion generation electrode" means an electrode that causes corona discharge when a high voltage is applied, producing ions in the air in the neighborhood of the tip of the electrode. The term "shield electrode" means an electrode that is placed near the ion generation electrode, and serves to assist the corona discharge at the tip of the ion generation electrode when an appropriate potential difference is produced between the shield electrode and the ion generation electrode.

In the invention, the term "tip of the ion generation electrode" means the nearest portion of the ion generation electrode to the virtual plane, and an electric field is produced in the portion to generate ions. Here, the term "virtual plane" means an appropriate plane assumed to exist substantially between the first and second ion generation electrodes.

In many cases, the ion generation electrode has an extended shape in the width direction. If at different points in the width direction of the ion generation electrode, the cross section perpendicular to the width direction contains a portion where an electric field serving to produce ions is formed, the nearest portion to the virtual plane is referred to as the "tip" at that position in the width direction. If for example, the ion generation electrode is an array of needle electrodes, each pointing in the direction of the normal to the electrical insulating sheet, that are aligned at appropriate intervals in the width direction, the tip of each needle is the tip of the ion generation electrode. If the ion generation electrode is a wire electrode comprising a wire extended in the sheet's width direction, the nearest portions of the wire to the virtual plane is assumed to be the "tip."

In the invention, the term "the first and second ion generation electrodes are opposed" means that the first and second ion generation electrodes are opposed to each other with the sheet's traveling path located between them, and that no conductors including shield electrode exist between the position of the foot of the perpendicular from the tip of the first ion generation electrode to the plain that contains the tip of the second ion generation electrode and that is parallel to the sheet's traveling path and the position of the tip of the second ion generation electrode.

Other apparatuses may comprise two or more wire electrodes aligned in the traveling direction of the electrical insulating sheet, or an ion generation electrode that comprises two more arrays of needle electrodes. If a neighboring wire electrode or needle electrode array works as a separate ion generation electrode, for example, in cases where a conductor (such as shield electrode) exists between the neighborhoods of the tips of two neighboring wire electrodes or needle electrode arrays and has a potential that differs by a half or more of the effective value of the alternating current voltage to be applied to these electrodes, or where the distance between two neighboring wire electrodes or needle electrode arrays is larger than the distance $d_1$ from them to the tip of the ion generation electrode that is opposed to the tips of the electrodes, such ion generation electrodes are assumed to be separate ones that belong to different charging units.

In the invention, the term "the third and fourth ion generation electrodes are opposed" is defined similarly.

In the description, the term "charging pattern" is used to describe a state where at least some local portions are charged positive or negative in an electrical insulating sheet. Such a state can be recognized by using, for example, fine powder (toner) etc. that forms a pattern to show the state (distribution) of charging.

In the invention, the "rear side equilibrium potential" of the first surface of the electrical insulating sheet is determined as follows: a grounding conductor is placed in contact with or near the opposite surface (rear side) at a distance of 10 μm or 20% of the thickness of the sheet, whichever the smaller so that an opposite-polarity charge equivalent to the charge on the rear side is induced to the grounding conductor to make the electric potential of the rear side become substantially 0 V, followed by measuring the electric potential of the first surface with the measuring probe of a surface electrometer placed sufficiently close to the sheet, namely, at a distance of about 0.5 to 2 [mm] to the first surface. Preferably, the measuring probe of the surface electrometer used has a small opening diameter of about several millimeters or less. Useful ones include Probe 1017 and Probe 1017EH manufactured by Monroe Electronics Inc. which have an opening diameter of 1.75 [mm] and 0.5 [mm], respectively.

The distribution of the charge density on the first surface can be determined by measuring the rear side equilibrium potential continuously while either the probe of the surface electrometer or the sheet with its rear side kept in contact with the grounding conductor is moved slowly (at about 5 [mm/sec]) using a position-adjustable moving means such as XY stage, followed by two-dimensional mapping of the data obtained. The rear side equilibrium potential of the second surface can be determined by the same procedure.

In the invention, the term "charge density" (represented in $[C/m^2]$) means the amount of the charge $[C]$ existing in a unit area $[m^2]$ of the sheet.

Here, a procedure to calculate the charge density from a measured rear side equilibrium potential is described below. The charge density can be calculated using the relational expression $\sigma = C \cdot v$, where $C$ $[\mu F/m^2]$ and $v$ respectively denote the electrostatic capacity per unit area of the sheet and the rear side equilibrium potential. The electrostatic capacity per unit area of the sheet, $C$, is determined from the using the relational expression $C = \epsilon_0 \epsilon_r / t$ for the electrostatic capacity per unit area of parallel flat plates. In the expression, $\epsilon_0$ and $\epsilon_r$ denote the dielectric constant in vacuum, which is assumed to be $8.854 \times 10^{-12}$ [F/m] and the dielectric constant of the film, respectively, and t is the thickness [m] of the film. An accurate value of the rear side equilibrium potential in a small local area, hence the local charge density, can be obtained using a surface electrometer with a field sufficiently small compared with the amount of local site of charge.

In the invention, the term "the apparent charge density" means the total of the local charge densities in the portions on both surfaces at the same positions in the same in-plane direction in the electrical insulating sheet. The local charge density is defined as the charge density in an area with a diameter of about 6 mm or less, preferably 2 mm or less, in the plane of the electrical insulating sheet.

In the invention, the term "apparently non-charged" means a state where the apparent charge density is substantially zero ($-2$ $\mu C/m^2$ or more and $2$ $\mu C/m^2$ or less) in different portions in the same in-plane direction in the electrical insulating sheet.

In the invention, the term "apparent static elimination" means a process of static elimination by which a portion where the apparent charge density is not substantially zero (less than $-2$ $\mu C/m^2$, or more than $+2$ $\mu C/m^2$) comes in an apparently non-charged state.

In the description, the term "both surfaces of the sheet are non-charged" means that the charge density in both first and second surfaces of the sheet is substantially zero ($-2$ $\mu C/m^2$ or more, $2$ $\mu C/m^2$ or less).

In the invention, the term "aerial potential" means the electric potential of an electrical insulating sheet that has been aerially laid. This is the total of static charges on both surfaces of the sheet measured relative to ground. The aerial potential of an apparently non-charged sheet is substantially 0 V in cases where the thickness of the sheet is sufficiently small and the total of the charges on the two surfaces of the sheet summed up without distinguishing them is substantially zero.

In the description, the term "both surfaces of the sheet are charged substantially uniformly" means that the amplitude (p-p) in the distribution of the rear side equilibrium potential in the first surface and that in the rear side equilibrium potential in the second surface are both 100V or less. There are no requirements for the average of the rear side equilibrium potential in the first surface and that in the second surface. Preferably, however, the absolute value of the average should be in the range of 0 V to 2 kV.

In the invention, the electric potential is always measured relative to ground. In most cases, shield electrodes and backup rolls for coating are grounded when used.

In the description, the coating thickness of a coating liquid is measured before drying of the coating liquid downstream in the sheet's traveling direction from the coating apparatus that applies the coating liquid to the coating layer smoothing apparatus that smoothes the coating liquid. Specifically, it is achieved in 2 to 10 seconds after the coating and before the start of drying. Available coating thickness measuring methods include, for example, calculation from the refraction factor of the coating liquid determined from the optical interference wave form. If the coating liquid supply apparatus uses a pump that weighs the coating liquid to ensure a constant feed rate, the coating thickness can be calculated from the sheet's traveling speed and the coating width in the sheet's width direction.

In the invention, the term "invariable (not changing) with time" means that the relevant state stays unchanged for 2 seconds or more, more preferably 20 seconds or more, still more preferably 2 minutes or more. For example, the term "applying a first ion cloud, which is unipolar with the polarity being invariable with time, from the first surface side" means applying an ion cloud that maintains a polarity, without the inversion of the polarity relative to ground, for 2 seconds or more, more preferably 20 seconds or more, still more preferably 2 minutes or more. It should be noted, however, that such polarity inversions do not include those caused by white noise or other non-periodic noise components.

EFFECT OF THE INVENTION

The invention provides an electrical insulating sheet coating apparatus that can coat an electrical insulating sheet without causing significant uneven coating or cissing of the coating liquid, making it possible to produce a coated electrical insulating sheet that is free of significant uneven coating and cissing of the coating liquid, as clearly seen from comparison between the examples and the comparative examples that are described below.

If the electrical insulating sheet and the coating liquid have the same polarity, the coating liquid pool that forms between the coating apparatus and the sheet can be stabilized, making it possible to produce a good coated sheet that is free of significant uneven.

Furthermore, the electrification of an electrical insulating liquid can be achieved efficiently by such a simple method as applying a voltage to a part of the liquid supply pipe. Use of the liquid as a coating liquid makes it possible to produce a coated electrical insulating sheet that is free of significant uneven coating.

MEANING OF SYMBOLS

Figure 1:
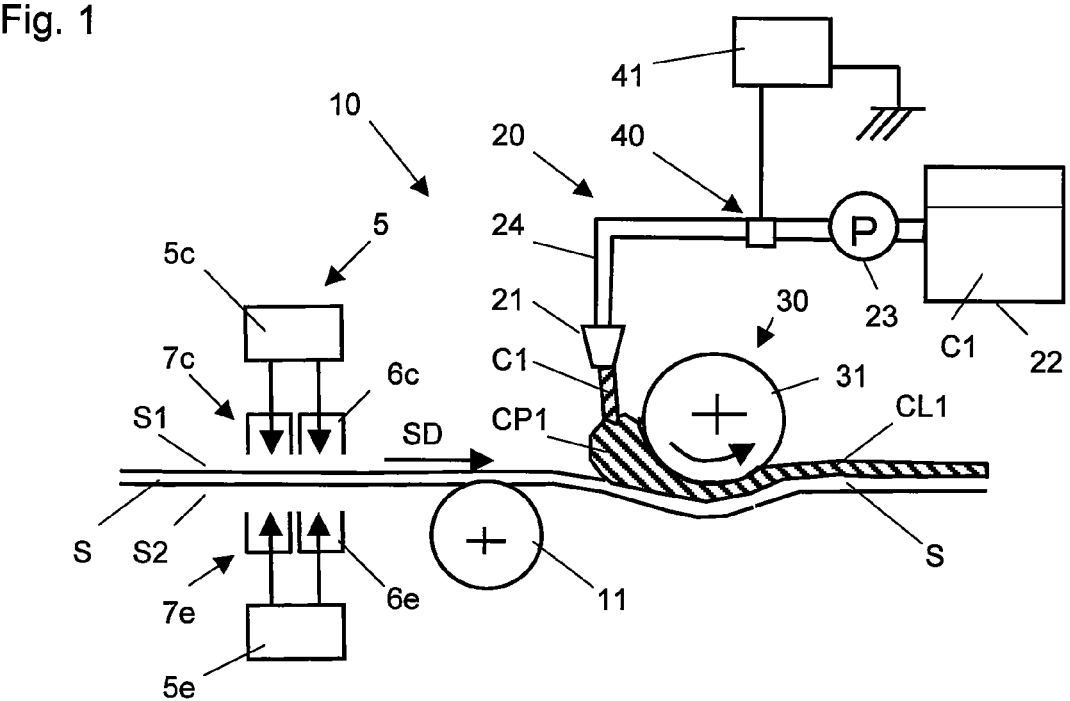
FIG. 1 shows a schematic side view of an embodiment of the coating apparatus of the invention.

C1: coating liquid (coating liquid applied over first surface)
C2: coating liquid (coating liquid applied over second surface)
CIE: induced charge
CP1: coating liquid pool (liquid pool of coating liquid C1)
CP2: coating liquid pool (liquid pool of coating liquid C2)
CL1: coating layer (coating layer formed by coating liquid C1)
CL2: coating layer (coating layer formed by coating liquid C2)
LEF: electric force lines
NC1: negative charge on first surface
NC2: negative charge on second surface
PC1: positive charge on first surface
PC2: positive charge on second surface
PS: electrical insulating sheet
PS1: first surface of electrical insulating sheet
PS2: second surface of electrical insulating sheet
PSD: traveling direction of electrical insulating sheet
S: electrical insulating sheet
S1: first surface of electrical insulating sheet
S2: second surface of electrical insulating sheet
SD: traveling direction of electrical insulating sheet
5: sheet charging apparatus
10: coating apparatus
10$a$: coating apparatus
10$b$: coating apparatus
10$c$: coating apparatus
11: conveyance roll
20: first surface coating liquid supply apparatus (coating liquid C1 supply apparatus)
20$a$: second surface coating liquid supply apparatus (coating liquid C2 supply apparatus)
21: discharging means (coating liquid C1 discharging means)
21$a$: discharging means (coating liquid C2 discharging means)
22: storage tank
23: pump
24: coating liquid supply pipe
30: first surface coating layer smoothing apparatus
30$a$: second surface coating layer smoothing apparatus
31: coating bar
31$a$: coating bar
40: coating liquid electrification apparatus
41: high voltage power supply
42: electrification element
43: joint
50: static eliminator
150: coating apparatus
151: corona discharge treatment apparatus
155: coating liquid supply apparatus
161: charge feed apparatus
162: coating liquid supply pipe
162$a$: coating liquid supply pipe
164: electrode tube

THE BEST MODE FOR CARRYING OUT THE INVENTION

The invention is described more in detail below with reference to examples and drawings. A plastic film is used as an electrical insulating sheet in these examples, but this does not intend to place any limitations on the invention.

As stated above, there are conventional coating apparatuses and coating methods proposed to apply a coating liquid on a surface of an electrical insulating film that is traveling continuously. However, conventional coating apparatuses and coating methods tend to cause a shape of a "liquid pool" to be unstable, resulting in uneven coating. Described below is an electrical insulating sheet coating apparatus and a method for producing an electrical insulating sheet having a coated film of the invention that can maintain a stable liquid pool to reduce uneven coating.

Figure 2:
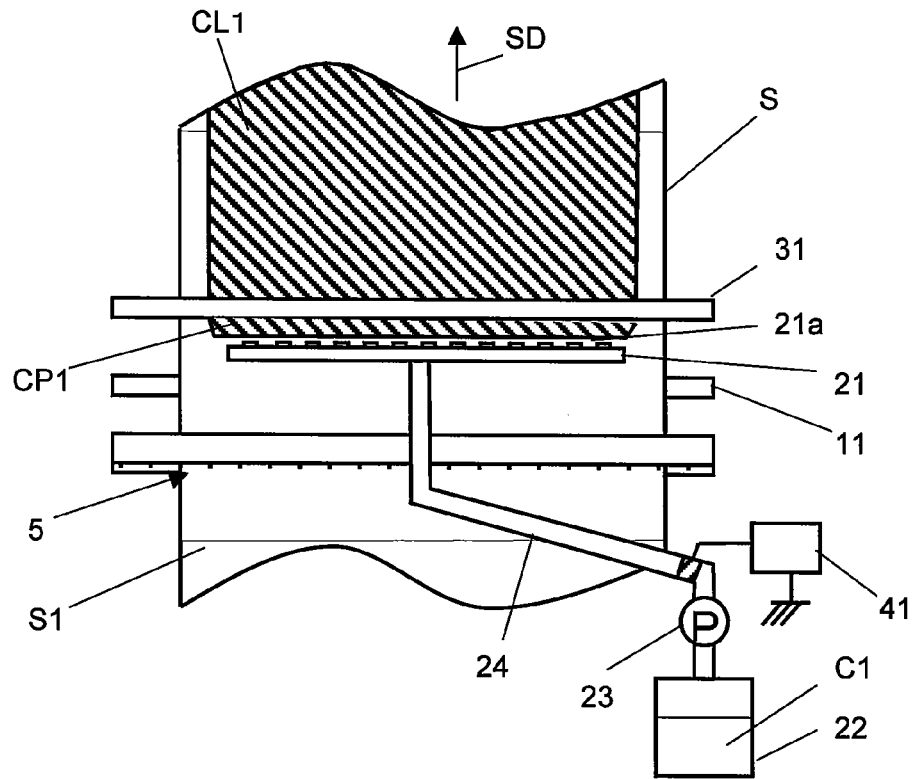
FIG. 2 shows a schematic plan view of a part of the coating apparatus given in FIG. 1.

FIGS. 1 and 2 show an embodiment of an electrical insulating sheet coating apparatus of the invention. In FIGS. 1 and 2, an electrical insulating sheet coating apparatus 10 of the invention has a sheet conveyance means that allows an electrical insulating sheet S to travel continuously in a predetermined traveling direction. A part of the sheet conveyance means is represented by a rotatable conveyance roll 11. In the figure, the upper side surface of the electrical insulating sheet S represents a first surface S1 of the electrical insulating sheet S, while the lower side surface represents a second surface S2 of the electrical insulating sheet S. The predetermined movement direction of the electrical insulating sheet S is indicated by the arrow SD. The electrical insulating sheet S travels and moves in the direction of the arrow SD while being supported by the conveyance roll 11.

A sheet charging apparatus 5 is provided to give charges to the first surface S1. A first surface coating liquid supply apparatus 20 is provided downstream in the traveling direction SD of the electrical insulating sheet S from the sheet charging apparatus 5. The first surface coating liquid supply apparatus 20 supplies a coating liquid C1 to the first surface S1. The sheet charging apparatus 5 provides the first surface S1 with a charge having the same polarity as the polarity of the coating liquid C1 that is being supplied to the first surface S1 from the first surface coating liquid supply apparatus 20.

The coating apparatus 10 has a first surface coating layer smoothing apparatus 30 that causes a measured amount of the coating liquid to adhere to the sheet S and smoothes a coating layer to achieve a uniform thickness. The first surface coating layer smoothing apparatus 30 is a coating bar type coating layer smoothing apparatus that comprises a rotatable coating bar 31. The coating bar 31 measures the amount of the coating liquid C1 adhered to the sheet S to ensure a predetermined coating thickness, and smoothes the coating layer. The coating bar 31 has a measuring capability and therefore also called metering bar. The coating bar 31 is a wire bar comprising a rod having a diameter of several millimeters to several tens of millimeters wound with a wire. The wire has a diameter in the range from several tenths to several millimeters. An appropriate size of the coating bar 31 is determined from the viscosity of the coating liquid C1, the required coating thickness, etc. A rod bar or a grooved bar that is produced by grooving a rod may also be used as coating bar 31.

A discharging unit of the first surface coating liquid supply apparatus 20 that serves to supply the coating liquid C1 to the first surface S1 comprises a discharging means 21 that comprising an array of two or more nozzles 21a located at appropriate intervals in the width direction the sheet S. From the tip of each nozzle 21a of the discharging means 21, the coating liquid C1 is discharged constantly and continuously to the first surface S1.

On the upstream side of the coating bar 31, a liquid pool CP1 of the coating liquid C1 supplied from the discharging means 21 is formed in contact with the first surface S1 and a surface of the coating bar 31. Preferably, the coating liquid discharging means 21 can allow the coating liquid C1 to be supplied directly to the liquid pool CP1. The supply of the coating liquid C1 to the liquid pool CP1 may be achieved by feeding it to the surface of the liquid pool CP1 or by inserting the coating liquid discharging port of the discharging means 21 into the liquid pool CP1 for direct feeding into the liquid pool CP1. The supply of the coating liquid C1 to the liquid pool CP1 may also be achieved by feeding the coating liquid to several portions of the liquid pool CP1. Further, the coating liquid may be allowed to flow down on a smooth surface of a plate-like body having a smooth surface that is open to the atmosphere so that the coating liquid that is uniform in the width direction of the first surface S1 is supplied to the liquid pool CP1.

The first surface coating liquid supply apparatus 20 comprises a storage tank 22 to store the coating liquid C1, a pump 23, and a coating liquid supply pipe 24. The coating liquid supply pipe 24 is connected to the former so that the coating liquid C1 is conveyed from the storage tank 22 to the discharging means 21 via the pump 23. By the action of the pump 23, the coating liquid C1 is discharged from each nozzle 21a at constant rate.

The coating liquid C1 easily undergoes frictional electrification in the coating liquid supply pipe 24 storage as it moves from the tank 22 to the discharging means 21. Frictional electrification takes place between two heterogeneous substances when they come in contact with each other, and they will be charged as a result of electrostatic charges with opposite polarities being caused in them. The polarity that occurs in each substance when it is charged depends on the triboelectric series. Therefore, the electrification of the coating liquid C1 can be controlled by selecting a coating liquid supply pipe 24 of an appropriate material for the coating liquid C1 to be used.

In connection with this electrification, on the other hand, the first surface coating liquid supply apparatus 20 has a coating liquid electrification apparatus 40 that is provided on a part of the coating liquid supply pipe 24. The coating liquid electrification apparatus 40 is connected with a high-voltage power supply 41. The coating liquid electrification apparatus 40 is provided downstream from the pump 23 in this embodiment, but the coating liquid electrification apparatus 40 may be located upstream from the pump 23.

The sheet charging apparatus 5 that serves to give an electrostatic charge to the electrical insulating sheet S comprises a unit 7c that is comprised of an electrode 6c provided on the side of the first surface S1 and a direct current power supply 5c connected with the electrode 6c and a unit 7e that is comprised of an electrode 6e provided on the side of the second surface S2 and a direct current power supply 5e connected with the electrode 6e. The units 7c and 7e are opposed to each other with the electrical insulating sheet S located between them. The constitution and role of the sheet charging apparatus 5 are described in detail below.

For the coating apparatus 10, the sheet S is supplied to the coating apparatus 10 by either of the following two processes.

In the first process, melted resin is extruded through an orifice, discharged onto a cooling roll, slowly cooled to form a sheet, and drawn to produce a thin film, and the film is supplied directly from this film production step to the coating apparatus 10. This is hereafter referred to as in-line process. If the drawing is achieved by a longitudinal drawing step and a subsequent transverse drawing step, and if the coating apparatus 10 is provided before the transverse drawing step, the application of the coating liquid can be performed easily because the film (the sheet S) is kept narrow during the coating step. If heating is performed during the transverse drawing step, the heating can serve to dry the solvent in the coating liquid.

In the second process, a film produced by the film production step is wound into a roll to form a film roll, and after that the film is pulled out from the film roll and supplied to the coating apparatus 10. This is hereafter referred to as off-line process.

An in-line type coating apparatus as described above may be used when, for example, a surface of an electrical insulating sheet is to be provided with a coating layer of a hard coat material, or provided with a coating layer of an optical material that serves for reflection prevention or optical filtering. In such cases, the sheet may be first drawn in the sheet's traveling direction, that is subjected to a longitudinal stretching step, and then allowed to travel though the coating step where the coating liquid is applied to form the coating layer over the surface of the sheet, and finally the sheet coated with the coating liquid in the coating step is sent to a step for stretch in the width direction, that is, the transverse drawing step. The sheet may be further drawn subsequently as required.

If the coating liquid C1 is supplied from the coating liquid discharging means 21 to the first surface S1 immediately upstream in the traveling direction SD of the sheet S from the coating bar 31, the liquid pool CP1 is formed upstream in the traveling direction SD of the sheet S from the coating bar 31.

It will be difficult, however, to maintain the liquid pool CP1 constantly in a stable shape. The reason is as follows. The coating liquid C1 is normally an electrical insulating liquid, and therefore, the coating liquid C1 will undergo frictional electrification as it flows in contact with the storage tank 22 and the coating liquid supply pipe 24. Thus the coating liquid C1 is more or less in a charged state. In the charged coating liquid C1, liquid particles have the same polarity and repulsion among them is caused by the Coulomb force, making the outer shape of the liquid pool CP1 unstable. In addition, such repulsion allows air to be taken in by the liquid pool CP1, making the outer shape of the liquid pool CP1 more unstable. As the shape of the liquid pool CP1 becomes unstable, uneven coating can sometimes take place in the coating layer CL1 that has been produced on the first surface S1 by applying the coating liquid C1. Uneven coating produces flow marks.

The present inventors found that the shape of the liquid pool CP1 was maintained stable if the electrical insulating sheet S and the coating liquid C1 had been charged with the same polarity. Specifically, if the coating liquid C1, for example, is charged with either the positive or the negative polarity, the first surface (surface to be coated) S1 of the electrical insulating sheet S is charged with charges having the same polarity as that of the coating liquid C1. Such charging of the sheet S serves to control and stabilize the shape of the liquid pool CP1 in the neighborhood of the coating bar 31. If the first surface (surface to be coated) S1 of the electrical insulating sheet S has a specific polarity, on the contrary, the coating liquid C1 should simply be charged to have the same polarity as the sheet.

The inventors also found that the shape of the liquid pool CP1 can be stabilized most easily if both the first surface (surface to be coated) S1 of the electrical insulating sheet S and the coating liquid C1 are forcedly charged with the same polarity. Thus, the shape of the liquid pool CP1 can remain stable if the sheet S has been forcedly charged to have the same polarity as the electrification polarity of the coating liquid C1 or the liquid pool CP1. It was also found that if the sheet S was charged with the opposite polarity to the coating liquid C1, on the contrary, the liquid pool CP1 became inclined to extend upstream in the traveling direction SD of the sheet S as if it was pulled by the charges on the sheet S, causing the external size of the liquid pool CP1 to decrease.

Figure 3A:
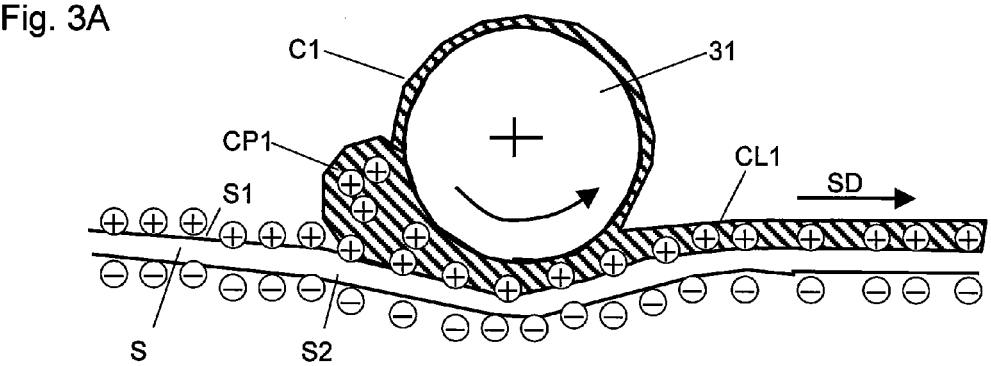
FIG. 3A shows a schematic side view that illustrates an example where a coating apparatus as given in FIG. 1 is used to apply a coating liquid over an electrical insulating sheet.

An example of this state is shown in FIG. 3A. In FIG. 3A, if the coating liquid C1, for example, has the positive electrification polarity the shape of the liquid pool CP1 is stabilized by charging the first surface (surface to be coated) S1 of the electrical insulating sheet S to have the positive polarity. Thus, if the first surface (surface to be coated) S1 of the electrical insulating sheet S is given a positive charge in FIG. 3A by the sheet charging apparatus 5 (FIG. 1) that is provided upstream from the coating liquid supply apparatus 20 (FIG. 1), a negative charge is simultaneously given to the second surface (opposite surface to the surface to be coated) S2. The charging method to be used will be described later.

The positive and negative charges on the first surface S1 and the second surface S2 are equivalent though having the opposite polarities, and therefore the sheet S is in an apparently non-charged state. If the second surface S2 of the electrical insulating sheet S is charged with the negative polarity in this case, the negative charge exists more away from the coating liquid C1 by the thickness of the sheet S. At the gap between the coating bar 31 and the electrical insulating sheet S, the electric field caused by the positive charge on the first surface S1 acts on the liquid pool CP1 more strongly than the negative charge on the second surface S2. As a result, if both the first surface S1 and the coating liquid C1 is charged with the positive polarity, the liquid pool CP1 is stabilized with its shape curved toward the outside of the coating bar 31 and the electrical insulating sheet S. In FIG. 3A, this state is illustrated by the external shape of a longitudinal cross section of the liquid pool CP1.

Figure 3B:
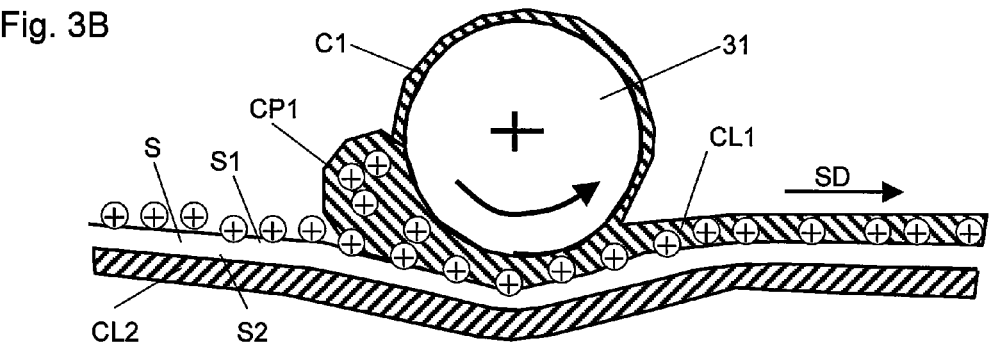
FIG. 3B shows a schematic side view that illustrates another example where a coating apparatus as given in FIG. 1 is used to apply a coating liquid over an electrical insulating sheet.

FIG. 3B shows a state different from that in FIG. 3A. If the coating liquid C2 is applied over the second surface S2, which is the opposite surface to the first surface (surface to be coated) S1 of the electrical insulating sheet S to produce the coating layer CL2 in FIG. 3B, the liquid pool CP1 is stabilized by the charges of the first surface S1 of the electrical insulating sheet S with the same polarity as the polarity of the coating liquid C1 (for example, positive sheet electrification for positive liquid). Thus, the action and effect of the invention can be achieved effectively if the coating layers CL1 and CL2 are to be produced respectively on the two surfaces of the electrical insulating sheet S.

If a water-soluble coating liquid C2, for example, is first applied on the second surface S2 to produce a coating layer CL2, followed by applying an electrical insulating coating liquid C1 on the first surface S1, the second surface S2 can act substantially as an electric conductor. This is because a water-containing, water-soluble coating liquid C2 produced by dissolving a water-soluble coating material in pure water should preferably have a volume resistivity of $10^9$ [Ω·cm] or less, more preferably $10^6$ [Ω·cm] or less.

In such a state, the coating layer CL2 formed on the second surface S2 has a potential of 0 [V] because it is grounded by the coating bar 31a (FIG. 7) for applying the coating liquid C2 on the second surface S2. Even in this state, the shape of the liquid pool CP1 will be more stabilized and uneven coating will be less likely to occur because the first surface S1 has the same polarity as the polarity of the coating liquid C1 and the second surface S2 is free of static charges with the opposite polarity.

Specifically, the electric field caused by the charges on the first surface S1 of the electrical insulating sheet S can act on the liquid pool CP1 more strongly in FIG. 3B than in FIG. 3A. So, the shape of the liquid pool CP1 can be stabilized at a smaller charge density on the sheet S. In both FIGS. 3A and 3B, the coating liquid C1 has a positive polarity and the first surface S1 is given a positive charge to the first surface S1 of the sheet S to have the same positive polarity as the coating liquid C1. However, the same effect can achieved in the case where the coating liquid C1 has a negative electrification polarity and the first surface S1 is charged to have the same negative polarity as the coating liquid C1.

In the case where the second surface S2, which is the opposite surface to the first surface S1, is also coated with the electrical insulating coating liquid C2 to produce the coating layer CL2, followed by applying the electrical insulating coating liquid C1 on the first surface S1, the shape of the liquid pool CP1 can be stabilized and uneven coating can be prevented because the first surface S1 has the same polarity as the polarity of the coating liquid C1. In this case, the shape of the liquid pool CP1 will be stabilized and uneven coating will be less likely to take place if the "aerial potential" which is measured during conveyance of the sheet S in the air, has the same polarity as the coating liquid C1 in addition to charging the first surface S1 to have the same polarity as the coating liquid C1.

Described below is the effect resulting from causing the first surface S1 of the electrical insulating sheet S to have the same polarity as that of the coating liquid C1.

The mechanism of the stabilization of the shape of the liquid pool CP1 has not been clarified. The inventors, however, assume that the shape of the liquid pool CP1 is stabilized through the process described below. The interface energy plays the dominant role in forming the shape of a very small droplet or a very thin liquid layer, as in the case of the liquid pool CP1 of the coating liquid C1. Liquid coheres to minimize its surface area in order to achieve the lowest free energy state. This energy is associated with the surface tension [mN/m]. Normally, liquid existing in a gap between two bodies will become rounded and form a liquid pool (meniscus). It can be assumed that in the inside of the charged liquid pool CP1, the Coulomb's force is generated among all particles contained in the coating liquid C1, and that the shape of the liquid pool CP1 will become unstable as the repulsive force exceeds the surface tension. Here, the total amount of charge of the particles in the coating liquid is represented as q12. The charge of the sheet S charged with the same polarity as the coating liquid C1 is newly added to the former. This charge of the sheet S is represented as q3.

Additional Coulomb's force (also a repulsive force) is generated between the charged sheet S and the charged coating liquid C1, and this Coulomb's force works to move the coating liquid C1 away from the electrical insulating sheet S in traveling. Thus, it can be assumed that the repulsive Coulomb's force of the between charged sheet and coating liquid is exceeded in the inside of the coating liquid C1 to move the coating liquid C1 away from the electrical insulating sheet S, resulting in the stabilization of the shape of the liquid pool CP1.

Furthermore, the coating bar 31 of the coating layer smoothing apparatus 30 for the first surface is provided downstream in the traveling direction SD of the sheet S. In most cases, the coating bar 31 is made of metal that has a stable electric potential, which is stabilized by grounding etc. The coating liquid C1 moving away from the electrical insulating sheet S remains in the liquid pool CP1 to stabilize the shape of the liquid pool CP1. Thus, the shape of the liquid pool CP1 is stabilized because there will be an effect as if the coating liquid C1 is thrust into the coating bar 31. Major components of the Coulomb's force acting on the coating liquid C1 are as follows: component A—surface energy and surface tension of the coating liquid, component B—repulsive Coulomb's force among particles in the coating liquid (associated with q12), and component C—Coulomb's force between charge on the sheet and the coating liquid (associated with q3, q12).

It is inferred that the shape of the liquid pool CP1 will be stabilized if the sum of the Coulomb's force A and the coulomb's force C is larger than the Coulomb's force B.

If the absolute value of the electric charge on the coating liquid C1 is large, an additional Coulomb's force is required to stabilize the shape of the liquid pool CP1, and therefore, the quantity of charge on the electrical insulating sheet S required for the stabilization of the shape of the liquid pool CP1 increases with the charge on the coating liquid C1. To the knowledge of the inventors, if the electrical insulating coating liquid C1 has a charge of about $10^{-4}$ [C/m$^3$] (=10 [nC/100 ml]), the first surface (surface to be coated) S1 of the electrical insulating sheet S should be so charged that the rear side equilibrium potential for the first surface S1 is in the range of 100 to 150 [V].

If the coating liquid C1 is in a substantially non-charged state, on the other hand, almost no Coulomb's force will be required to stabilize the shape of the liquid pool CP1, and the shape of the liquid pool CP1 can be stabilized even if the charge on the electrical insulating sheet S is very small. Specifically, in the case where the coating liquid C1 is in a substantially non-charged state, or where the electric charge of the liquid is in the range of $-2 \times 10^{-5}$ to $+2 \times 10^{-5}$ [C/m$^3$] ($-2$ to $+2$ [nC/100 ml]), it is possible to stabilize the shape of the liquid pool CP1 even if the first surface (surface to be coated) S1 is in a substantially non-charged state having a charge of $-2$ to $+2$ [μC/m$^2$]. In the case where the coating liquid C1 is in the substantially non-charged state, the shape of the liquid pool CP1 can also be stabilized by giving an excessive amount of static charge to the first surface (surface to be coated) S1.

To achieve the working of the invention effectively, it is important for both the coating liquid C1 and the electrical insulating sheet S to be charged with the same polarity. So, it is also preferable for not only the polarity of the electrical insulating sheet S but also that of the coating liquid C1 to be adjusted.

In the coating apparatus 10 in FIG. 1, the coating liquid electrification apparatus 40 that is electrically insulated from the other components is provided in a part of the coating liquid supply pipe 24. The coating liquid electrification apparatus 40 is connected with the high-voltage power supply 41. The polarity and the voltage of the applied power supplied by the high-voltage power supply 41 can be adjusted to ensure appropriate electrification of the coating liquid C1. The polarity of the applied power is either positive or negative and preferably the absolute value of the voltage is 3 kV or less, more preferably 2 kV or less. The lower limit of the preferable applied voltage range is 0.1 kV. This is because corona discharge can be caused at conductive portions (edges and local tips in particular) if a high voltage having an absolute value of 3 to 4 kV or more is applied.

For the application of a voltage, a direct current may be applied continuously, or it may be applied intermittently at constant intervals. Either will be effective as long as observation of the electrified state of the coating liquid C1 indicates that the liquid pool CP1 is charged and that the shape of the liquid pool CP1 is in a stable state. The coating liquid electrification apparatus 40 may not be used and electricity may not be applied to it if it is not necessary. Thus, the polarity of the coating liquid C1 is adjusted so that the coating liquid C1 and the electrical insulating sheet S have the same polarity.

Described below is static elimination to achieve a non-charged state of the coating liquid C1. The amount of charge on the coating liquid C1 depends on the polarity of the applied power from the high-voltage power supply 41, its voltage [V], and the flow rate of the coating liquid [m$^3$/min]. In the case where the coating liquid C1 is charged with the same polarity as that of the applied power from the high-voltage power supply 41, the amount of charge on the coating liquid C1 is in proportion to the voltage of applied power from the high-voltage power supply 41. Therefore, the coating liquid C1 can also be made substantially non-charged by adjusting the polarity and the voltage of the applied power from the high-voltage power supply 41.

If the coating liquid C1, for example, is electrified with the positive polarity, then a power with the negative polarity is applied to the coating liquid C1. Then, the amount of charges on the coating liquid C1 is measured after this electrification adjustment. For readjustment, the voltage of the applied power is increased if the liquid still has the positive polarity, while the voltage of the applied power is decreased of it has the negative polarity. This makes it possible to adjust the amount of charge on the coating liquid C to $-2\times10^{-5}$ to $+2\times10^{-5}[C/m^3]$ ($-2$ to $+2$ n[C/100 ml]) and obtain a substantially non-charged coating liquid C1.

Described below is the coating liquid electrification apparatus 40. For the portion where the coating liquid electrification apparatus 40 comes in contact with the electrical insulating coating liquid C1, it is assumed that the length in the across section perpendicular to the flow direction of the coating liquid C1 is h [mm], while the length in the flow direction of the liquid is k [mm]. If the length k is too long, it will become difficult to connect the coating liquid supply pipe 24 while electrically insulating the portion, or the coating liquid electrification apparatus 40 will have to be large in size. If the length h is too long, on the other hand, the amount of the coating liquid C1 in contact with the inner wall of the portion will decrease, making it impossible to electrify the coating liquid C1 efficiently. The length h should be minimized, therefore, after considering the required flow rate of the coating liquid C1 and pressure loss. Thus, for the coating liquid electrification apparatus 40, the length k should be minimized, or in an extreme case, it may have a ring-like shape, and preferably the relation $0.02 \leq k/h \leq 20$ is satisfied.

Described here are methods for measuring the amount of charge in a coating liquid. The use of Faraday cage has been known widely as a method to measure the polarity and the amount of charge of a coating liquid. In other methods, an electrode for detection is provided in the pipe that conveys the coating liquid and the electric potential on it is measured. Or an insulated conductive electrode is provided in the pipe that conveys the coating liquid, and the electric potential on it is measured.

In the method that uses a Faraday cage to measure the amount of charge in a coating liquid, a branch from the coating liquid conveying pipe is provided, and a part of the coating liquid introduced into the Faraday cage, where the polarity and the amount of charge are measured. A method to use a Faraday cage for detection of a charge in a coating liquid is shown in Non-patent document 1. The method is designed to measure the total amount of the charge in a charged body that can be collected, and so the Faraday cage comprises an inner metal container that contains the charged body, an outer metal container that is grounded and insulated from the former, a capacitor, and a voltmeter.

If the inner container is sufficiently larger than the charged body, all electric force lines generated from the electric charge of $+Q$ in the charged body converge in the plane of the inner container. So, an electric charge of $-Q$, which has the same value with the opposite sign, is induced in the inner wall of the inner container while an electric charge of $+Q$, which has the same value with the same sign, is induced in the outer wall of the inner container. If the electrostatic capacity between the inner container and the outer container is represented as Cf, then the electric potential Vf is expressed by the following equation: $Vf=Q/Cf$. So, the electric charge Q can be determined from measurements of the electric potential Vf. In actual cases, the capacitor Cs for measurement is connected in parallel to Cf, and the voltage V between the two ends is measured. An electrometer having an extremely large input impedance is used as the voltmeter.

To determine the polarity of a coating liquid, the total charge of the coating liquid that can be collected is measured to see whether the average value is positive or negative. Thus, if positive and negative charges coexist, the charged state of the coating liquid is determined based on the sum of all positive and negative charges in spite of the proportion and distribution these positive and negative charges. Specifically, the amount of the charge in the coating liquid is determined by taking $10^{-4}$ to $5\times10^{-4}$ $m^3$ of the coating liquid from the coating liquid pipe, putting it in the Faraday cage, measuring the polarity and the amount of the charge, and converting the measured amount of the charge in the coating liquid to the amount of the electric charge per unit volume [$m^3$] of the coating liquid.

Figure 7:
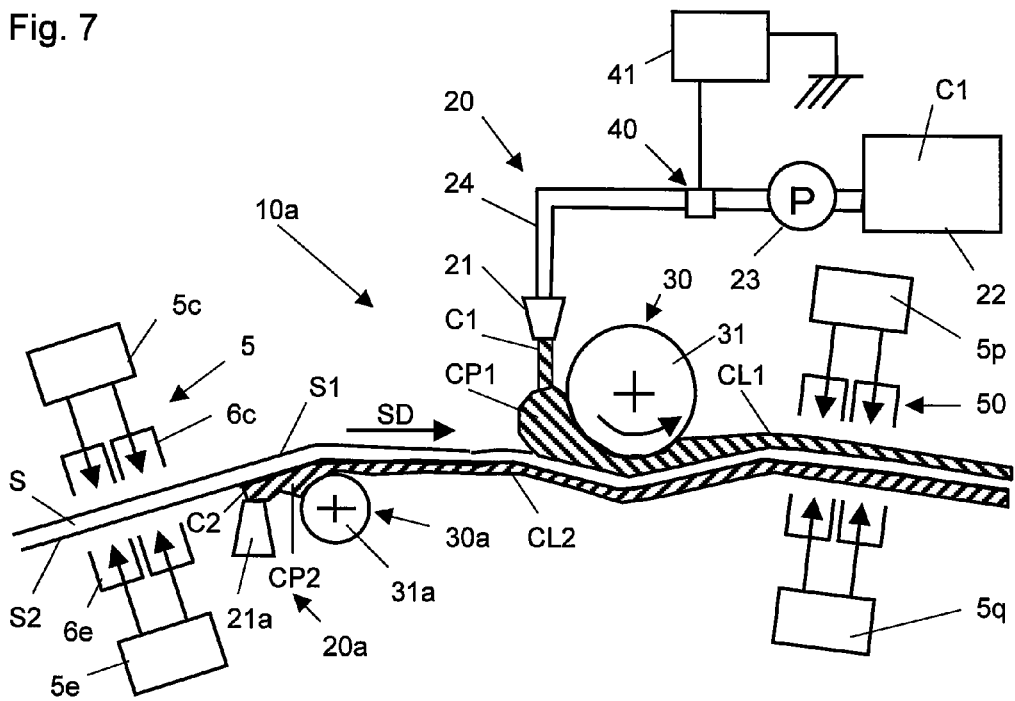
FIG. 7 shows a schematic side view of still another embodiment of the coating apparatus of the invention.

FIG. 7 shows another embodiment of the coating apparatus of the invention. In FIG. 7, the coating apparatus 10a is designed to apply in advance an aqueous coating liquid (water-soluble coating liquid) C2 on the second surface S2 of the electrical insulating sheet S given in FIG. 3B. To achieve this, a second surface coating liquid supply apparatus 20a is provided to apply a coating liquid C2 on the second surface S2 of the electrical insulating sheet S at a position downstream in the traveling direction SD of the sheet S from the sheet charging apparatus 5 and upstream from the first surface coating liquid supply apparatus 20.

The second surface coating liquid supply apparatus 20a is provided with a coating liquid discharging means 21a that is similar to the coating liquid discharging means 21. The second surface coating liquid supply apparatus 20a has a similar configuration as the first surface coating liquid supply apparatus 20, and so the coating liquid supply pipe for the coating liquid discharging means 21a and some other components are not shown in the figure. A second surface coating layer smoothing apparatus 30a that is designed to adjust the thickness of the coating liquid discharged from the coating liquid discharging means 21a and applied on the second surface S2 is provided on the downstream side of the coating liquid discharging means 21a, the second surface coating layer smoothing apparatus 30a having a coating bar 31a that is similar to the coating bar 31.

In FIG. 7, the coating apparatus 10a is located after the longitudinal stretching step and before the transverse stretching step in the above-mentioned film production process. Thus, the coating apparatus 10a is used as an in-line component. The sheet S drawn in the longitudinal stretching step then goes through the sheet charging apparatus 5, the second surface coating liquid supply apparatus 20a, the second surface coating layer smoothing apparatus 30a, the first surface coating liquid supply apparatus 20, and the first surface coating layer smoothing apparatus 30, and finally reaches the static elimination apparatus 50. This static elimination apparatus 50 is described later.

With the sheet charging apparatus 5, a charge having the same polarity as that of the coating liquid C1 is given to the first surface S1 of the sheet S, and a charge having the opposite polarity is given to the second surface S2. The charged state here is described later. In this state, however, the second surface S2 is coated with the water-soluble coating liquid C2, and the coating layer CL2, which has been measured and smoothed by the coating bar 31a, is formed on the second surface S2. Subsequently, the first surface S1 is coated with the electrical insulating coating liquid C1.

As describe above, the coating bar 31a, which is grounded, causes the overall electric potential of the coating layer CL2 of the second surface S2 to be 0 V. Since the first surface S1 is charged in this state to have the same polarity as that of the coating liquid C1, the coating liquid C1 supplied from the first surface coating liquid supply apparatus 20 forms the liquid pool CP1 stably at the position of the coating bar 31, serving to prevent uneven coating from taking place in the first surface S1 of the coating liquid C1.

Described next is the coating liquid. The viscosity of the coating liquid is related to the sheet's traveling speed. The viscosity of the coating liquid should preferably be in the range of 10 to 2000 [mP·s]. If the viscosity of the coating liquid is too low, it will be difficult for a required liquid pool to form, but a small liquid pool will form instead on the side of the coating bar as a result of the charging of the sheet. To prevent this, the viscosity of the coating liquid should preferably be 10 [mP·s] or more. If the viscosity of the coating liquid is too high, on the other hand, it tends to be failed to be applied in the sheet's width direction, frequently leaving uncoated portions and leading to a large coating thickness. To prevent this, the viscosity of the coating liquid should preferably be 2000 [mP·s] or less.

When the coating thickness is large, it requires a larger amount of the coating liquid to be supplied from the coating liquid supply apparatus. A larger amount of the coating liquid will be applied, frequently making the liquid pool unstable. If a large amount of the coating liquid is supplied, furthermore, the Coulomb's force acting to move the coating liquid away from the electrical insulating sheet decreases in inverse proportion to the square of the distance, making the liquid pool unstable. If the coating thickness is too small, on the contrary, the liquid pool will also be small, and the charges will not work effectively to stabilize the liquid pool. Thus, the coating thickness should preferably be in the range of 1 to 50 [μm]. The flow rate of the coating liquid supplied to the coating apparatus should preferably be about $5 \times 10^{-5}$ to $5 \times 10^{-4}$ [m$^3$/min], depending on the sheet's traveling speed and the required coating thickness.

If the coating liquid is charged forcedly, the absolute value of the charge in the coating liquid should preferably be $10^{-3}$ [C/m$^3$] or less because an excessive charge will prevent stable discharge of the coating liquid in the coating liquid supply process.

Figure 4:
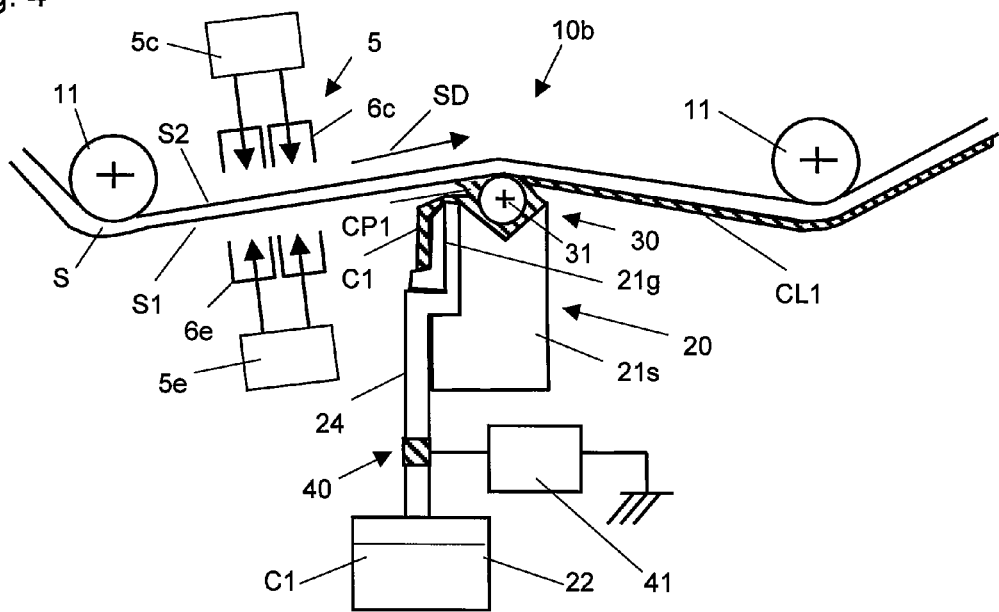
FIG. 4 shows a schematic side view of another embodiment of the coating apparatus of the invention.
Figure 5A:
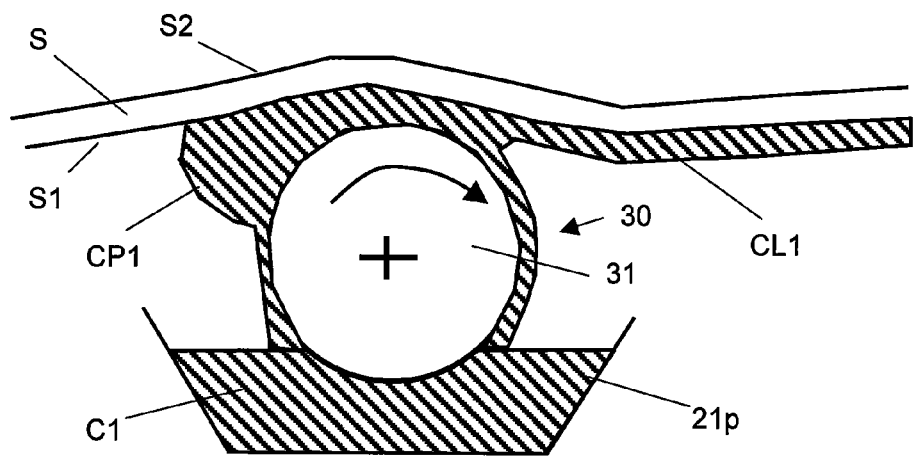
FIG. 5A shows a schematic side view that illustrates an example where a coating apparatus as given in FIG. 4 is used to apply a coating liquid over an electrical insulating sheet.
Figure 5B:
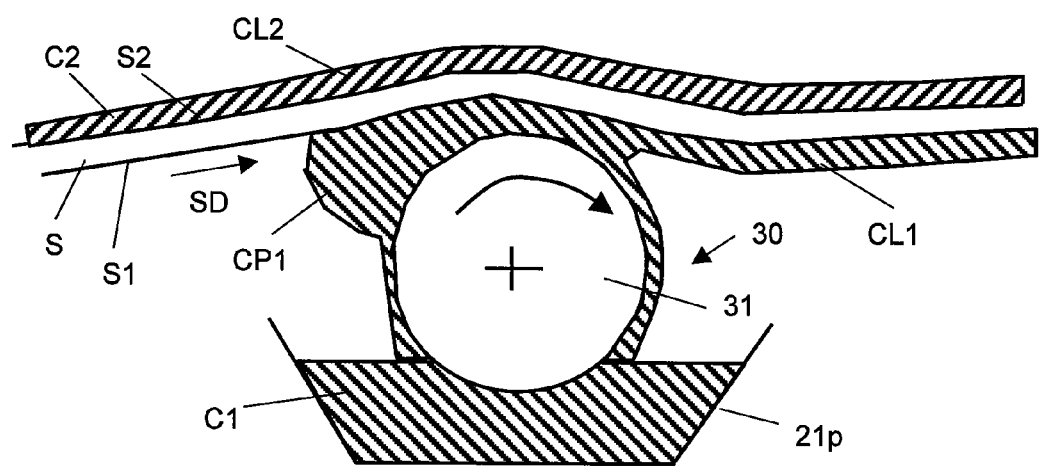
FIG. 5B shows a schematic side view that illustrates another example where a coating apparatus as given in FIG. 4 is used to apply a coating liquid over an electrical insulating sheet.

Another embodiment of the coating apparatus of the invention is shown in FIGS. 4, 5A, and 5B. In a coating apparatus 10b shown in FIG. 4, an electrical insulating sheet S travels and moves in a direction of arrow SD while being supported by conveyance rolls 11. A first surface coating liquid supply apparatus 20 comprises a bar supporter 21s having a manifold, a coating liquid guiding groove 21g provided on the bar supporter 21s, a coating liquid supply pipe 24 to supply a coating liquid C1 to the coating liquid guiding groove 21g, and a coating liquid storage tank 22 to supply the coating liquid C1 to the coating liquid supply pipe 24. A coating liquid electrification apparatus 40 is provided in a part of the coating liquid supply pipe 24.

In the coating apparatus 10b, the bottom surface of the sheet S is a first surface (surface to be coated) S1 of the electrical insulating sheet S to be coated with the coating liquid C1. Thus, the first surface S1 is the lower surface in the direction of gravitational force. The coating liquid C1 is supplied from the storage tank 22 to the coating liquid guiding groove 21g via the coating liquid supply pipe 24.

A sheet charging apparatus 5 that gives an electrostatic charge to the electrical insulating sheet S is provided upstream from the first surface coating liquid supply apparatus 20. The sheet charging apparatus 5 has an electrode 6c and an electrode 6e that are opposed to each other with the electrical insulating sheet S located between them, the electrode 6c being connected with a first direct current power supply 5c and the electrode 6e being connected with a second direct current power supply 5e. Electricity having the opposite polarity is applied to the first direct current power supply 5c and the second direct current power supply 5e.

FIG. 5A shows an enlarged view of and around a coating bar 31 of the coating apparatus 10b given in FIG. 4. The first surface coating liquid supply apparatus 20 existing in FIG. 4 has been replaced with a coating liquid pan 21p. In FIG. 5A, a coating bar 31 of a coated film layer smoothing apparatus 30 rotates the same direction as the traveling direction SD of the electrical insulating sheet S. A liquid pool CP1 is formed on the upstream side of the coating bar 31. By this moment, the lower surface of the electrical insulating sheet S, that is, the first surface (surface to be coated) S1, has been charged uniformly with a negative electrostatic charge by the sheet charging apparatus 5 (FIG. 4). The liquid pool CP1 is stabilized as the coating liquid electrification apparatus 40 (FIG. 4) charges the coating liquid C1 to have the negative polarity.

The shape of the liquid pool CP1 in FIG. 5A is curved toward outside relative to the shortest line connecting between the coating bar 31 and the electrical insulating sheet S, but the liquid pool CP1 may be stabilized with its shape curved toward inside relative to the shortest line, depending on the properties of the coating liquid. A coating layer CL1 can be made free of uneven coating of the coating liquid C1 by maintaining a stable shape of the liquid pool CP1.

In the embodiment in FIG. 5B, a coating liquid C1 is applied on the first surface S1 of the electrical insulating sheet S given in FIG. 5A, the second surface S2 of the electrical insulating sheet S having already been coated with the coating liquid C2 to produce the coating layer CL2. In FIG. 5B, the liquid pool CP1 is stabilized by charging the first surface (surface to be coated) S1 of the electrical insulating sheet S to have the same polarity as that of the coating liquid C1 (for example, negative electrification if coating liquid has negative polarity) despite the second surface S2 having been coated with the coating liquid C2. If the coating layer CL2 on the second surface S2 has been formed of an aqueous coating liquid C2, a more stable liquid pool CP1 will be produced to prevent uneven coating of the coating liquid C1 as described for FIG. 3B.

Figure 6:
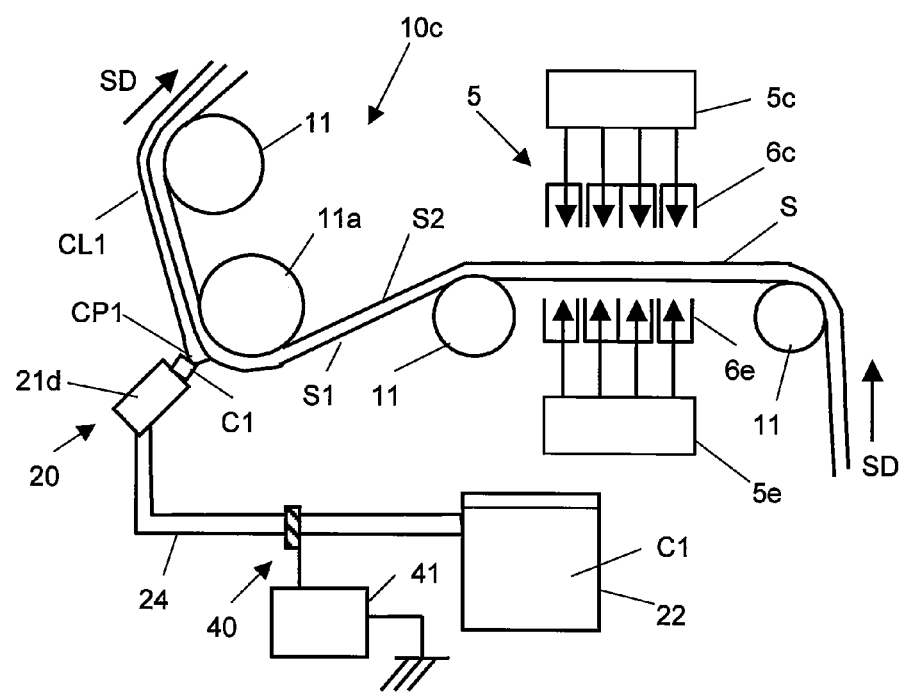
FIG. 6 shows a schematic side view of still another embodiment of the coating apparatus of the invention.

FIG. 6 shows another embodiment of the coating apparatus of the invention. In a coating apparatus 10c in FIG. 6, an electrical insulating sheet S travels and moves in a direction of arrow SD while being supported by conveyance rolls 11. A sheet charging apparatus 5, a first surface coating liquid supply apparatus 20, and a coating liquid electrification apparatus 40 are located as illustrated in FIG. 6.

The first surface coating liquid supply apparatus 20 in the coating apparatus 10c comprises a die head 21d. A first surface S1 of the electrical insulating sheet S is coated with a coating liquid C1 discharged from the die head 21d to form a coating layer CL1 as the electrical insulating sheet S pulled out from an electrical insulating sheet roll, which is in the shape of a roll, changes its traveling directions SD to the direction of the arrow SD while traveling between two or more conveyance rolls 11. The coating layer CL1 produced is then dried in a drying apparatus and finally wound up into a roll by a winding apparatus. The electrical insulating sheet roll, drying apparatus, and winding apparatus are not shown in the figure.

The coating liquid C1 discharged from the die head 21d is applied on the first surface (surface to be coated) S1 to produce the coating layer CL1 as the electrical insulating sheet S comes in contact with a surface of a backup roll 11a while traveling. The backup roll 11a serves to ensure stable traveling of the electrical insulating sheet S and maintain a constant gap from the die head 21d. A hard-chrome plated metal or a roll coated with elastic material, for example, may be used as the backup roll 11a.

A positive electrostatic charge is given to the first surface (surface to be coated) S1 from the sheet charging apparatus 5 while a negative electrostatic charge is given to the opposite surface, that is, the second surface S2. When the second surface S2 comes in contact with a metal surface of the backup roll 11a, its charge is apparently cancelled by the charge with the opposite polarity that has been induced in the metal surface which is a conductor. The charge on the first surface S1, which is the opposite surface to the metal surface, on the other hand, is cancelled only partly by the charge induced in the metal surface because the cancellation is imperfect as the first surface S1 is away from the metal surface by thickness of the sheet S, remaining some electric charge on the first surface S1. Even in such cases, the negative charge on the first surface S1 can work effectively, and the liquid pool CP1 can be stabilized by electrifying the coating liquid C1 to have the same polarity.

Described next are preferable charging methods for electrical insulating sheets. Described first is one of such charging methods, which uses a non-contact technique to provide a sheet with a charge to allow the liquid pool to be stabilized by a Coulomb's force. Described, furthermore, is another charging method which produces a more preferable state where uneven coating is prevented from being caused in the coating layer as a result of the electrification of the electrical insulating sheet. These charging methods for electrical insulating sheets are effectively used to implement the invention.

The charged state of an electrical insulating sheet is described first. The electrical insulating sheet to be used is high in surface resistivity and volume resistivity. Once charged, therefore, the electric charge can hardly move in an in-plane direction or in the thickness direction in the sheet. Portions having positive electrostatic charge can be produced if electric discharge takes place in an electrical insulating sheet in such a state, or if an excessive amount of negative electrostatic charge is removed from a local area. In such a case, a discharge mark, which is a mark produced by electrostatic discharge, can be left in the electrical insulating sheet. Such a discharge mark is also called static mark. In a state where a static mark takes place, positive and negative electrostatic charges may coexist in a surface of a sheet where electrostatic charges are distributed, or they may coexist in its two surfaces.

If positive and negative electrostatic charges coexist in the surface of a sheet, there will be a very large amount of charges which is about several to 500 [$\mu C/m^2$] in terms of charge density. If charged regions having the positive and the negative polarity coexist in the first and second surfaces of a sheet, the charge on each surface has the opposite polarity with a charge density of about several tens to 500 [$\mu C/m^2$]. The sum of the charge density on the two surfaces will be several to several tens or less [$\mu C/m^2$]. If this sum of charge densities is −2 [$\mu C/m^2$] or less, or +2 [$\mu C/m^2$] or more, such a state is defined as "apparently non-charged."

If positive and negative charges coexist close to each other, the electric force lines resulting from the electrostatic charges are closed between the above-mentioned charged regions having the opposite polarities. So, the intensity of the electric field decreases very quickly with the distance from them. The surface electric potential measured in a sheet conveyed in the air is referred to as "aerial potential." The "aerial potential" is the total electric charge on the two surfaces the sheet as measured relative to ground. The "aerial potential" is determined as the sum of all charges on the assumption that the thickness of the sheet is sufficiently small compared with the distance from the grounded point and that the charged state on the two surfaces of the sheet are not distinguished. So, even if strong charges having the opposite polarities exist on the two surfaces, the total charge appears to be zero and the value of the aerial potential is also nearly zero if the charges consist of the same amount of positive and negative charges. In may cases, therefore, a large amount of positive and negative charges actually exists even if the sheet has an "aerial potential" of nearly zero and appears to be non-charged and suitable for use.

Figure 18:
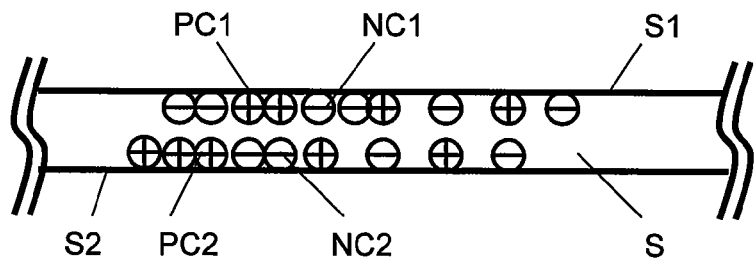
FIG. 18 shows a schematic side view that illustrates an electrical insulating sheet in another charged state.

FIG. 18 shows a schematic side view describing a charged state of an electrical insulating sheet. In FIG. 18, a charged state is schematically illustrated in terms of the number of static charges. In FIG. 18, positive charges PC1 (4 units) and negative charges NC1 (6 units) exist on a first surface S1 of an electrical insulating sheet S, and positive charges PC2 (5 units) and negative charges NC2 (4 units) exist on a second surface S2. For the electrical insulating sheet S, therefore, the sum of the static charges on the two surfaces is not zero, and the sheet is not in an "apparently non-charged" state.

Figure 17:
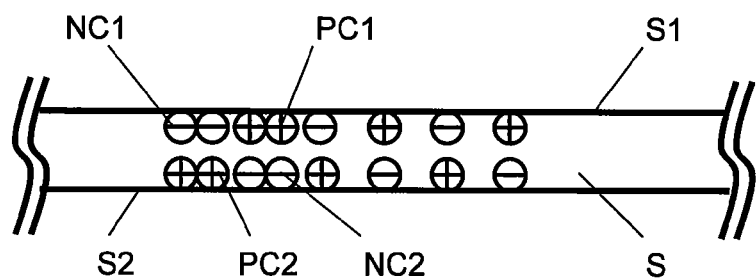
FIG. 17 shows a schematic side view that illustrates an electrical insulating sheet in an apparently non-charged state.

FIG. 17, on the other hand, shows a schematic side view that describes another charged state of an electrical insulating sheet. In FIG. 17, the charged state is schematically illustrated in terms of the number of static charges. In FIG. 17, positive charges PC1 (4 units) and negative charges NC1 (4 units) exist on a first surface S1 of an electrical insulating sheet S, and positive charges PC2 (4 units) and negative charges NC2 (4 units) exist on a second surface S2. These charges comprise pairs of charges having opposite polarities existing on the first surface S1 and the second surface S2 of the sheet. Therefore, the sum of the charges on the two surfaces of the electrical insulating sheet S is nearly zero, and the sheet is in an "apparently non-charged" state. In most of such cases, the aerial potential is also substantially zero.

The charge density on each surface of the sheet S is determined by the method described below. Specifically, the charge density is determined by causing a surface of the sheet S to come in contact with a conductor and measuring the "rear side equilibrium potential." The rear side equilibrium potential is measured with the probe of a surface electrometer held sufficiently close to the sheet S with a distance of about 1 to 2 [mm]. The local charge density $\sigma[\mu C/m^2]$ on the surface under measurement is calculated from the relational expression $\sigma = C \cdot v$, where v, C and $\sigma$ denote the rear side equilibrium potential [V], electrostatic capacity per unit area [$\mu F/m^2$] and charge density.

For a thin sheet such as film, the electrostatic capacity per unit area, C, is determined from the electrostatic capacity per unit area of parallel flat plates which is expressed by the equation $C = \epsilon_0 \epsilon_r / t$ (where, $\epsilon_0$, $\epsilon_r$, and t denote the dielectric constant in vacuum or $8.854 \times 10^{-12}$ [F/m], dielectric constant of the sheet, and thickness of the sheet [m], respectively). With the other surface held in contact with the conductor, the rear side equilibrium potential v [V] and the charged density [$\mu C/m^2$] of the other surface of the sheet is determined.

Described next is uneven coating caused in a charged state where positive and negative charges coexist on each surface of the sheet. To the knowledge of the inventors, there are different generation mechanisms of uneven coating and three conditions under which uneven coating does not occur. The degree of uneven coating can be decreased to a substantially permissible level by meeting all three conditions.

Condition I: The charged states on the two surfaces of the sheet are well balanced, making the sheet "apparently non-charged" and the total of the charge densities in different portions is in the range of −2 to +2 [$\mu C/m^2$].

Condition II: The charge densities on the two surfaces of the sheet are sufficiently small, and the difference between the maximum and minimum of the absolute value of the rear side equilibrium potential is 340 [V] or less, preferably 200 [V] or less.

Condition III: The charge densities on the two surfaces of the sheet are sufficiently small, and the rate of change in the charge density is 0.18 [$C/m^2/m$] or less, preferably 0.12 [$C/m^2/m$] or less.

The limiting conditions for the generation of uneven coating depend on physical parameters of the coating liquid (surface tension, surface energy, viscosity, amount of electric charges in coating material that constitutes the coating liquid, etc.) and physical parameters of the sheet (surface tension, surface energy, surface roughness, etc.), and the degree of uneven coating depends on the time of contact with the metal roll and the easiness of traveling of coating material, but uneven coating is not likely to occur if any of the above-mentioned conditions is satisfied. Each condition and the related generation mechanism of uneven coating are described below.

Condition I is for the prevention of generation of uneven coating in the case where the sheet is held in the air when it is coated. This condition is intended to maintain the sheet in an apparently non-charged state. Uneven coating results from charging of the sheet if it has an aerial potential in the range of several [kV] to several tens [kV]. The charged state in such a case is as shown in FIG. 18. Local portions of a sheet in this state are not apparently non-charged.

The apparently non-charged sheet held in the air as shown in FIG. 17, on the other hand, is likely to suffer little uneven coating. This is because the electric field formed will be closed between the first surface and the second surface of the sheet, and coating in this state will not work to apply a strong electric field on the coating liquid. In this state, the total of charge density measurements taken at different positions of the charged sheet will be in the range of −2 to +2 [$\mu C/m^2$]. As a method to confirm that the total charged density is in the range of −2 to +2 [$\mu C/m^2$], toner is sprinkled over the sheet held above ground to see if the sheet is free of local adhesion of the toner. This is because toner will normally adhere to the sheet if there is local charge density with an absolute value of 2 [$\mu C/m^2$] or more.

Conditions II and III are described next. Conditions II and III relate to uneven coating that can be caused in a sheet held on a metal roll. A sheet is not only conveyed in the air, but frequently travels on a roll. A sheet, for example, will travel on a backup roll of a coater or on a conveyance roll that worked to change the traveling direction of the sheet. A surface of the sheet is coated with the coating liquid while the other surface is contact with a metal surface of the backup roll.

Figure 19:
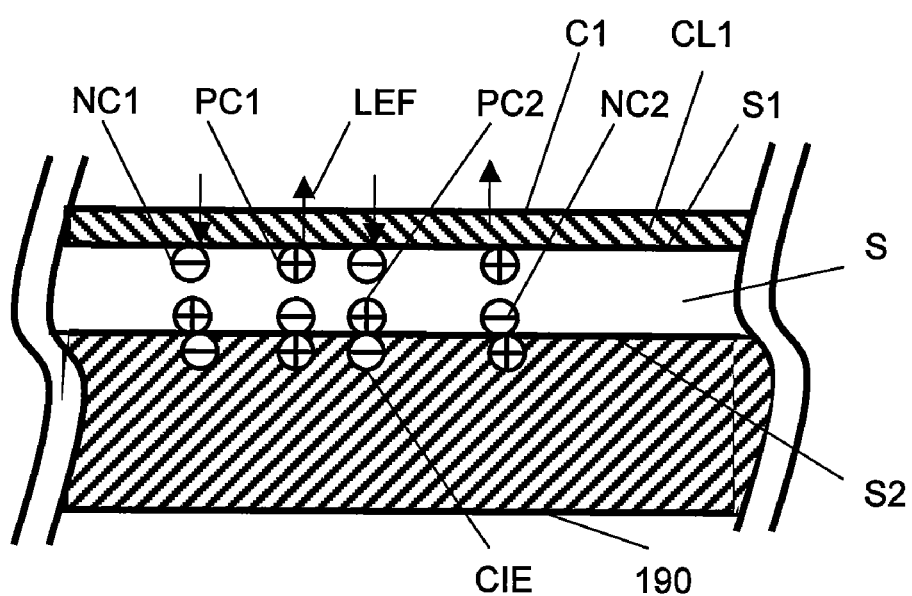
FIG. 19 shows a schematic side view that illustrates the charged state of an electrical insulating sheet with a conductor layer adhered to one of its surfaces.

Such a state is shown in FIG. 19. FIG. 19 illustrates a sheet S in which a surface S1 (first surface) and the opposite surface S2 (second surface) are charged equally with the opposite polarities, that is, the sheet S has an aerial potential of zero. In such a sheet S, charges PC2 and NC2 generated in the second surface S2 of the sheet S that is the metal surface of an electric conductor 190 is apparently cancelled by the induced charge CIE with the opposite polarity that is induced in the surface of the electric conductor 190.

In the first surface S1 coated with the coating liquid, which is on the opposite side to the second surface S2 that is in contact with the surface of the electric conductor 190, on the other hand, part of the charges are cancelled by the charges induced in the surface of the electric conductor 190. The first surface S1, however, is more away from the surface of the electric conductor 190 than the second surface S2, and therefore undergoes less cancellation correspondingly. So, the first surface S1 has apparent charges. Similarly, the first surface will have apparent charges in the case where the first surface S1 of the sheet S is coated with a coating liquid after the second surface has been coated with a water-containing coating liquid. Uneven coating is caused in a state where positive and negative charges resulting from such apparent charging coexist in the surfaces of the sheet S. In this case, uneven coating cannot be eliminated if the sheet S is "apparently non-charged" with its two surfaces charged equally with the opposite polarities.

Condition II is intended to prevent uneven coating from being caused when the coating liquid is applied on the surface opposite to the surface that is in contact with the backup roll etc. as the electrical insulating sheet S travels on that backup roll etc. For both the first surface S1 and the second surface S2 of the sheet S, this condition serves to decrease the difference between the maximum and minimum of the absolute value of the rear side equilibrium potential. If Condition II is not met, the electric field that results from the electrostatic charges existing in the first surface (surface to be coated) S1 and mainly acting in the thickness direction of the sheet S has effect on the coating layer CL1 to cause uneven coating. The thickness of the coating layer CL1, or the coating thickness of the coating liquid, is proportional to the absolute value of the rear side equilibrium potential. Thus, the thickness is large at portions where the absolute value of the rear side equilibrium potential is large, while it is small at positions where the absolute value of the rear side equilibrium potential is small.

If positive and negative charges exist, the minimum of the absolute value of the rear side equilibrium potential is 0 V, and the coating thickness is smallest at the boundary between the portions with the positive and the negative polarity, where potential is 0 V. The coating thickness of charged portions increases with the absolute value of the rear side equilibrium potential. If the minimum and the maximum of the absolute value of the rear side equilibrium potential differ little, the coating thickness will vary little over the entire coating surface. The coating thickness will be large on the whole if both the minimum and the maximum of the absolute value of the rear side equilibrium electric exceeds 340 [V], but uneven coating will not be caused if the difference between the maximum and the minimum is small. Even if the coating thickness is large on the whole, serious problems will not be caused in most cases if uneven coating does not take place.

Condition III is intended to prevent uneven coating that is easily caused when positively charged portions and negative charged portions exist densely and alternately. So, the condition is designed to prevent uneven coating that is cased by the electric field that results from positive and negative electrostatic charges in each surface of the sheet S and acts in the direction of the sheet surface. The discharge mark is one of the charging patterns where positively charged portions and negatively charged portions exist densely and alternately. The electric field that results from the electrostatic charges existing in the first surface (surface to be coated) S1 and acts mainly in the direction of the planes of positively charged and negatively charged portions, positively electrified and non-charged portions, or negatively electrified and non-charged portions that are neighboring to each other in each surface of the sheet S has effect on the coating layer CL1 to cause uneven coating. Uneven coating that results from the electric field in the direction of the surface of the sheet S has the feature that the thickness of the coating layer CL1 is large in the boundary regions between positively charged and negatively charged portions.

Figure 15:
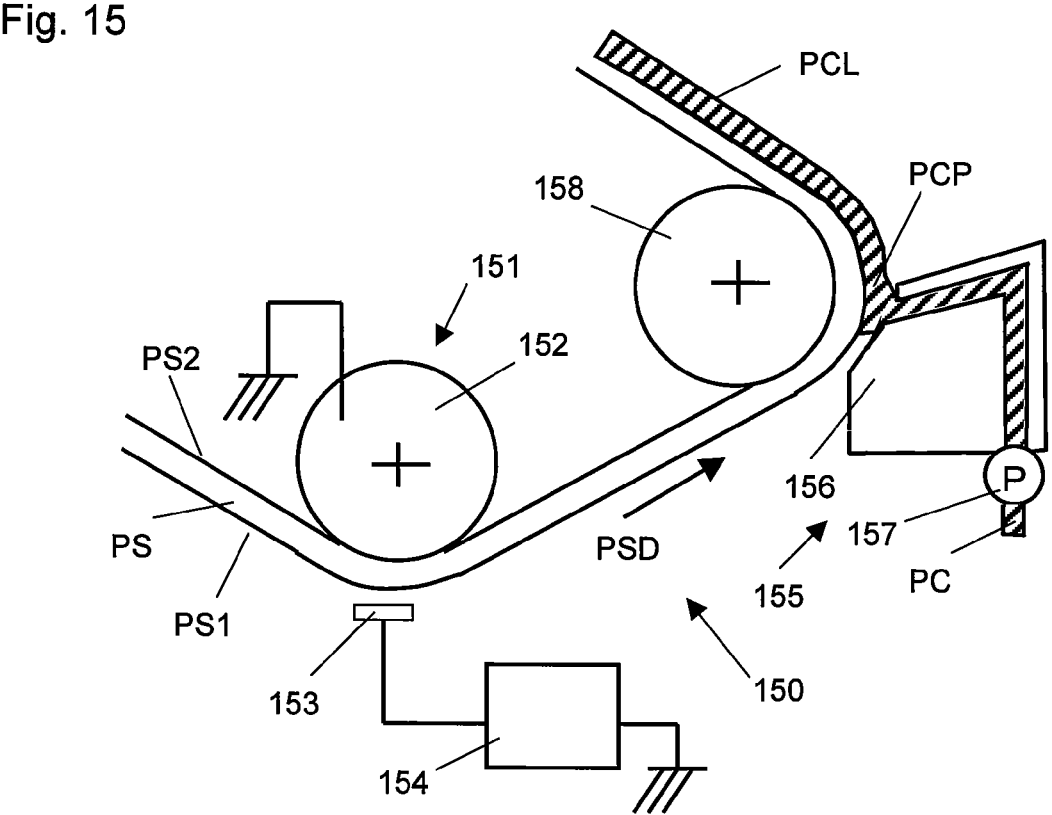
FIG. 15 shows a schematic side view of a conventional coating apparatus.

Described below is the conventional technique disclosed in Patent document 2, which is designed to perform corona discharge treatment to electrify a sheet PS as shown in FIG. 15. Normally, only the first surface (surface to be coated) PS1 is strongly charged if unipolar charges is given to the first surface (surface to be coated) PS1 of the sheet PS by the corona discharge treatment apparatus 151. Electric discharge will occur when the sheet PS is removed from the grounded counter electrode roll 152, resulting in discharge mark in the second surface PS2. This produces local positive and negative charges in both surfaces of the sheet PS. As the corona discharge treatment uses unstable discharge, the electrostatic charges in the second surface PS2 tends to be non-uniform in many cases.

In such a case, electrostatic charges having the opposite polarities exist in the first surface PS1 and the second surface PS2, and the sheet is in an "apparently non-charged" state where the electrostatic charges are not well balanced between the two surfaces. This state does not meet the Condition I which is intended to prevent uneven coating, and uneven coating will be caused when the sheet PS is conveyed in the air as described above. If an apparently non-charged state should be achieved by carrying out static elimination from the sheet PS after the corona discharge treatment, local charge patterns of positive and negative charges will remain in both surfaces of the sheet PS. Thus, the sheet PS cannot meet the Conditions II and III, it is in a charged state where uneven coating is likely to be caused. If unipolar electrostatic charges are given to the first surface (surface to be coated) PS1 of the sheet PS to electrify it during the corona discharge treatment, not only the sheet PS will fail to come into an apparently non-charged state, but also local charge patterns will be produced in both surfaces, which even encourage the formation of uneven coating.

In such cases where the electrical insulating sheet is expected to suffer serious uneven coating as a result of electrification, the method of charging of the electrical insulating sheet described below has been used as a preferable way of solving the problem.

Figure 8:
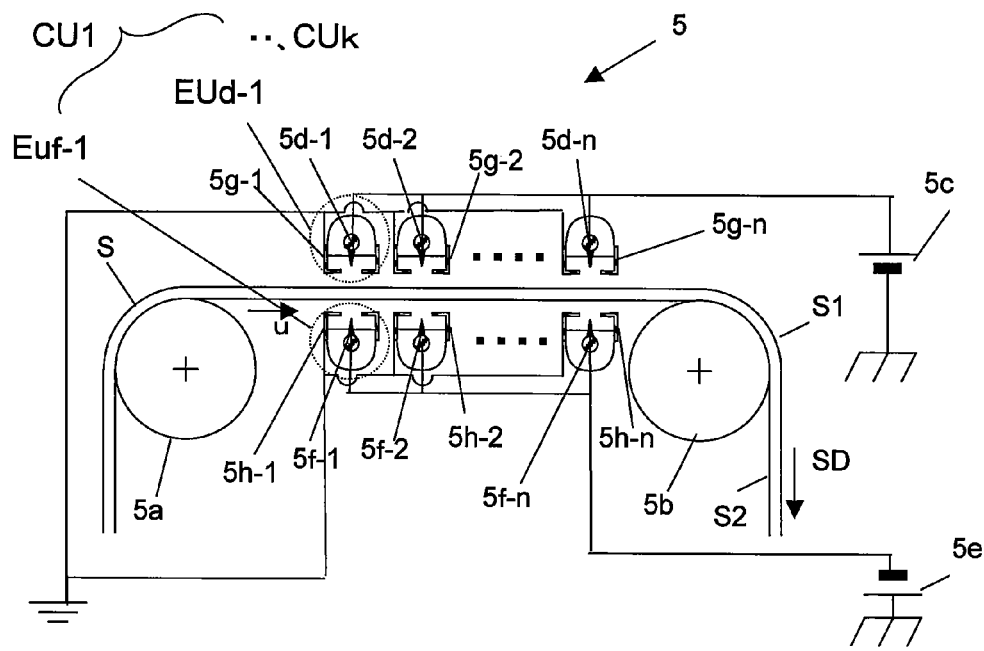
FIG. 8 shows a schematic side view of a typical electrical insulating sheet charging apparatus that is preferable for use in the coating apparatus of the invention.
Figure 9:
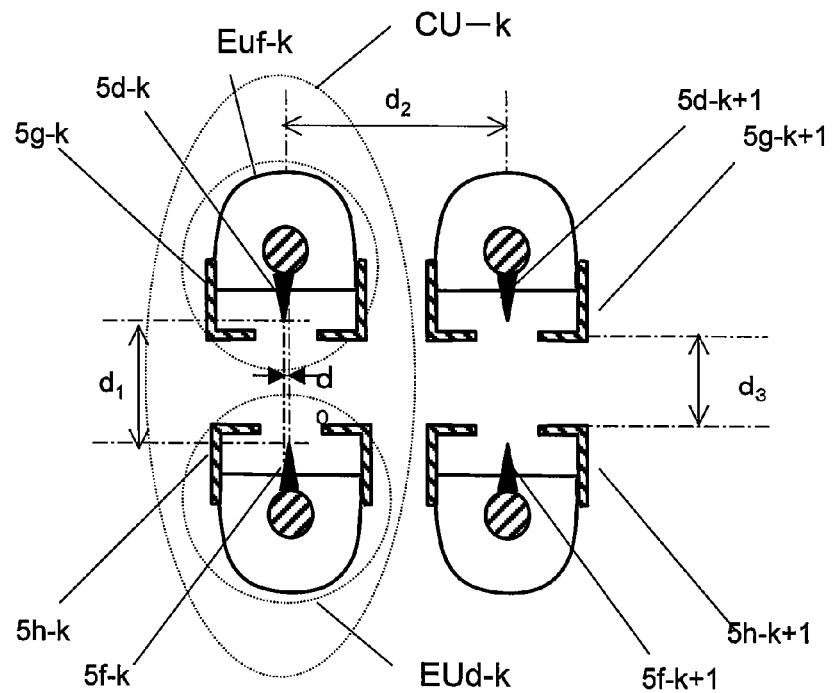
FIG. 9 shows an enlarged schematic side view of a part of the electrical insulating sheet charging apparatus given in FIG. 8.

FIG. 8 shows a schematic side view of a typical sheet charging apparatus for electrical insulating sheets that is used preferably for the coating apparatus of the invention. As seen from FIGS. 1, 4, 6 and 7, a coating liquid supply apparatus and a coating layer smoothing apparatus are located downstream in a traveling direction SD of a sheet S from a sheet charging apparatus 5 that is shown in FIG. 8. FIG. 9 shows an enlarged side view of a typical charging unit of the sheet charging apparatus 5 that is illustrated in FIG. 8.

In FIG. 8, the sheet charging apparatus 5 has a left hand side guide roll 5a and a right hand side guide roll 5b that serve to convey the sheet S. The guide roll 5b is not used in some cases. The electrical insulating sheet S travels on the guide roll 5a and the guide roll 5b, and the sheet S moves continuously in the direction of arrow SD at a speed of u [m/min] as the guide rolls 5a and 5b are rotated clockwise by driving force of a motor that is not shown in the figure. Between the guide roll 5a and guide roll 5b, N charging units CU1, . . . , CUn are provided at intervals at opposed positions with the sheet S located in between.

The first charging unit CU1 comprises a first electrode unit ENd-1 and a second electrode unit ENf-1. The first electrode unit is faced with the first surface S1 of the sheet S, with a gap from the first surface S1. The second electrode unit ENf-1 is faced with the second surface S2 of the sheet S, with a gap from the second surface S2. The first electrode unit ENd-1 and the second electrode unit ENf-1 are opposed to each other, with the sheet S located in between.

Assuming that k can be an integer in the range of 1 to n, the k'th charging unit CUk comprises the first electrode unit EUd-k and the second electrode unit EUf-k. The first electrode unit is faced with the first surface S1 of the sheet S, with a gap from the first surface S1. The second electrode unit ENf-k is faced with the second surface S2 of the sheet S, with a gap from the second surface s2. The first electrode unit ENd-k and the second electrode unit ENf-k are opposed to each other, with the sheet S located in between.

Described next is the configuration of the k'th charging unit CUk of the sheet charging apparatus 5. The description is focused on the first charging unit CU1 as a representative. The optimum number N of and the optimum intervals between the charging units depend on the use conditions.

The first electrode unit EUd-1 comprises a first ion generation electrode $5d$-1, a first shield electrode $5g$-1 that has an opening toward the first ion generation electrode, and an insulation component. The second electrode unit comprises a second ion generation electrode $5f$-1, a second shield electrode $5h$-1 that has an opening toward the second ion generation electrode, and an insulation component.

The opening of the first shield electrode $5g$-1 is opened in the neighborhood of the tip of the first ion generation electrode $5d$-1 toward the sheet S. The first and the second shield electrode $5g$-1 and $5h$-1 assist the discharge from the ion generation electrodes $5d$-1 and $5f$-1 when an appropriate electric potential difference is caused relative to the first and the second ion generation electrode $5d$-1 and $5f$-1. They also play the role of allowing the sheet S to be exposed substantially uniformly to the ions irradiated from the opposed first and second ion generation electrodes. This allows the shield electrodes $5d$-1 and $5f$-1 to work to decrease the concentration of the local electric field by using the electricity having the opposite polarity on the opposed first and second ion generation electrodes. This prevents the ions from being released exclusively in the downward direction from the ion generation electrode as a result of the concentration.

The tip of the first ion generation electrode $5d$-1 and the tip of the second ion generation electrode $5f$-1 are provided apart by $d_1$-1 in the direction of the normal to the sheet S and by $d_0$-1 in the traveling direction SD of the sheet S. The first shield electrode $5g$-1 and the second shield electrode $5h$-1 are located so that the portions in them that are closest to the sheet S are apart by $d_3$-1 in the direction of the normal to the sheet S.

The first ion generation electrode $5d$-1 and the second ion generation electrode $5f$-1 in the charging units CUk (1 to n) are connected respectively with the first direct current power supply $5c$ and the second direct current power supply $5e$ that have the opposite polarities. The first and second shield electrodes $5g$-1 and $5h$-1 are grounded.

All of the first ion generation electrodes $5dk$ (1 to n) of the charging units CUk (1 to n) are connected with direct current power supplies having the same polarity, while all of the second ion generation electrodes $5fk$ (1 to n) are connected with direct current power supplies that have the same polarity that is opposite to that for the first ion generation electrodes. Only one direct current power supply may be used, or two more may be used to vary the applied voltage.

The direct current power supply used can maintain an output voltage with the same polarity relative to ground continuously for one second or more without polarity inversion, and has a ripple factor of 5% or less, preferably 1% or less. It is not seriously necessary to take the lower limit of the ripple factor into consideration, but it should practically be 0.01% or more. This is because a direct current power supply having this or higher accuracy will be expensive.

In FIGS. 1, 4, 6 and 7, 2 to 4 charging units are provided, and the tips of neighboring ion generation electrodes are at intervals d2 of 50 [mm] in the traveling direction SD of the sheet S. This example uses 2 to 4 charging units, but the number of charging units to be used may depend on the conveyance speed of the sheet S and the amount of charges to be given. It may also be decided appropriately whether a positive or negative voltage should be applied to the first and the second ion generation electrode.

In the embodiment, the first and the second ion generation electrode in each charging unit and the corresponding shield electrodes have substantially the same configuration and substantially the same electric potential. The voltage applied to the first ion generation electrode and that applied to the second ion generation electrode are substantially the same. Generally, the ion generation electrodes do not necessarily have substantially the same configuration, and the applied electric potentials are not necessarily have the same value. For the size, location and applied voltage, it will be sufficient if individual ion generation electrodes etc. separately meet required use conditions. Even if the voltage applied to the first ion generation electrode of each charging unit differs a little from that applied to the second ion generation electrode, serious problems will not occur if the working and effect described above are achieved effectively.

Simply described next is the action of the sheet charging apparatus 5 shown in FIG. 8. The action of the charging unit CUk is simply described below. The description is focused on the first charging unit CU1 as a representative. In particular, described is a case where a positive voltage is applied to the first ion generation electrode 5*d*-1 in the first charging unit CU1 while a negative voltage is applied to the second ion generation electrode 5*f*-1. Here, positive and negative ions are released from the first ion generation electrode 5*d*-1 and the second ion generation electrode 5*f*-1, respectively. If a strong electric field is produced between the first ion generation electrode 5*d*-1 and the second ion generation electrode 5*f*-1, the electric field works to forcedly irradiate positive and negative ions to the electrical insulating sheet S. The positive ions released from the first ion generation electrode 5*d*-1 and the negative ions released from the second ion generation electrode 5*f*-1 are attracted along the electric force lines produced by the opposed first and second ion generation electrodes 5*d*-1 and 5*f*-1, respectively, toward the neighborhood of the electrical insulating sheet S, and finally adhered to the electrical insulating sheet S.

During this process, positive and negative charges are simultaneously given to the first surface S1 and the second surface S2 and the electrical insulating sheet S is maintained in an apparently non-charged state, allowing the electrical insulating sheet S to be charged with a sufficient amount of positive and negative ions that are generated by the first and the second ion generation electrodes. If the sheet S moves at a speed u of about 100 [m/min], ions of about 10 to 30 [$\mu C/m^2$] are irradiated from each charging unit. As the traveling speed u of the sheet S decreases, the amount of ion irradiation per unit area increases with the amount of ion irradiation in inverse proportion to the speed u. For this ion irradiation, the two surfaces of the sheet S are given ions having the opposite polarities and charged to nearly the same degree, making the sheet apparently non-charged.

This ion irradiation has the feature that certain amounts of charge density [$\mu C/m^2$] are superposed regardless of the thickness of the sheet S. Concerning the intensity of the ion irradiation, at high applied voltages V [V], the amount of ions generated by the ion generation electrode increases nearly in proportion to the voltage of the applied power. The voltage on the opposed ion generation electrodes will become high, and therefore, the ions generated by the opposed ion generation electrodes will be accelerated in proportion to the intensity of the electric field so that they are attracted toward the surface of the sheet S. Thus, the intensity of the ion irradiation increases in proportion to the square of the applied voltage V. If the distance between the first and the second ion generation electrode in the charging unit decreases, on the other hand, the distance to the opposed ion generation electrodes will increase and the intensity of the electric field will also increase. As the distance further decreases, the ion clouds generated by the ion generation electrodes will be condensed and become stronger. Thus, it can be assumed that at small distances, the intensity of the ion irradiation increases in inverse proportion to the square of the distance.

Patent document 6 discloses a static eliminator that has a configuration in which the ion generation electrode to be provided on each surface of the sheet and comprises three wire electrodes aligned parallel to the sheet's traveling direction, to which a direct current voltage having the same polarity is applied. Ion irradiation is performed once in the apparatus.

In the case where a voltage having substantially opposite polarity is to be applied to the first and the second ion generation electrode charging unit so that pairs of unipolar ion clouds having substantially opposite polarities are simultaneously generated by the first and the second ion generation electrode of each charging unit and simultaneously irradiated to an electrical insulating sheet, two or more charging units may be provided together to generate ion clouds having the same polarity which will expand three dimensionally to serve as a static elimination gate. As a result, coupling of positive and negative ions become unlikely to occur so that a sufficient amount of ions can be held in the static elimination gate, and repulsion between ions having the same polarity works to accelerate the diffusion of the ions in the sheet's longitudinal direction, resulting in greater effect than simply increasing the number of charging units.

The sheet charging apparatus 5 shown in FIG. 8 can cause the first surface S1 and the second surface S2 of the electrical insulating sheet S to be charged equally with the opposite polarities and uniformly in the width direction. Such a charged state meets all of the above-mentioned conditions, namely, Conditions I, II and III, to prevent uneven coating. If a local charge distribution exists in the surfaces of the electrical insulating sheet S, such as due to charge patterns resulting from above-mentioned corona discharge treatment, the sheet charging apparatus 5 serves to level the local charged distribution in the surfaces of the electrical insulating sheet S and electrify the first surface S1 of the electrical insulating sheet S to have the same polarity as that of the coating liquid C1.

The positive ion and negative ions irradiated by the sheet charging apparatus 5 are stored on the first surface S1 and the second surface S2 so that the first surface S1 and the second surface S2 will be strongly charged, for example, positively and negatively, respectively. During this process, the negative charge NC1 in the first surface S1 attracts more positive ions selectively, while positive ions are moved away selectively from the positive charge PC1 in the first surface S1. Thus, the first surface S1 is entirely charged positively while reducing the difference between the positive charge PC1 and the negative charge NC1 existing in the first surface S1. For the second surface S2, there will be a similar effect with the opposite polarity. As a result, the charge density distribution produced by positive negative charges will be smoothed to an ineffective level, making uneven coating unlikely to occur. In addition, the first surface S1 is charged uniformly with the same polarity as the coating liquid C1, serving to stabilize the liquid pool CP and making flow marks unlikely to occur.

Described next is the maximum permissible degree of uniform charging of the surfaces of the sheet S. The maximum charge density held in the electrical insulating sheet S in the atmosphere is about 27 [$\mu C/m^2$] where dielectric breakdown occurs in the air. This value is effective for a sheet S of polyester having a thickness in the range of 1 to 100 µm. However, if the electrical insulating sheet S is thin with a thickness of 0.5 mm or less and if a conductor is in close contact with the back surface (which is the opposite surface to the surface to be coated with the coating liquid), charges having the opposite sign to the insulator's surface electric charge is induced in the back surface to decrease the intensity of the electric field on the insulator's surface, making charging above the maximum charge density permissible.

The permissible level of charge density existing on the surface of the sheet S is in inverse proportion to the distance between the back surface and the conductor. According to Non-patent document 2, if the insulator has a thickness of 8 [mm], electric discharge accompanied by strong light emission occurs along the insulator's surface as the surface charge density becomes 250 [$\mu C/m^2$] or more. If the sheet S has a thickness of 500 [µm] or less and the first surface S1 and the second surface S2 of the sheet S are charged equally with the opposite polarities, it is apparently non-charged and free of electric discharge during ordinary conveyance in the air, and therefore, there will be no upper limit to the permissible charge density. When it is placed on a metal plate, the charge density for the maximum permissible uniform charging can be assumed to be 5 [$mC/m^2$].

Practically, the rear side equilibrium potential required to stabilize the liquid pool CP is normally in the range of 300 to 800 [V], depending on the thickness [m] of the electrical insulating sheet S. In the case where the electrical insulating sheet S has a thickness of 0.0003 [m], a rear side equilibrium potential of 500 [V] corresponds to a charge density of about 44 [$\mu C/m^2$] when $\in_r$ is 3. The sheet S has to be charged more strongly with an increasing degree of electrification of the coating liquid C1. Since the amount of charges per charging unit is 10 to 30 [$\mu C/m^2$], about two charging units can serve sufficiently. The conditions for the sheet charging apparatus 5 may be set up based on observed stability of the liquid pool CP, though this is not applicable to all cases because optimum conditions depend on the distance d1 between the ion generation electrodes in the charging unit, the voltage of applied power V, line speed, etc.

Described next is post-processes (additional processes) for stabilization of the liquid pool CP and prevention of uneven coating in the case where the electrical insulating sheet S and the coating liquid C1 are charged with the same polarity. As finished products, coated electrical insulating sheets should preferably be non-charged although the degree of charges is sufficiently low. A static elimination method for that purpose is described below.

Described below is a static elimination method that is effective for electrical insulating sheets in which positive and negative electrostatic charges coexist, electrical insulating sheets having two surfaces charged equally with the opposite polarities, and electrical insulating sheets charged by the corona discharge treatment, for which conventional static eliminators cannot serve effectively.

Figure 10:
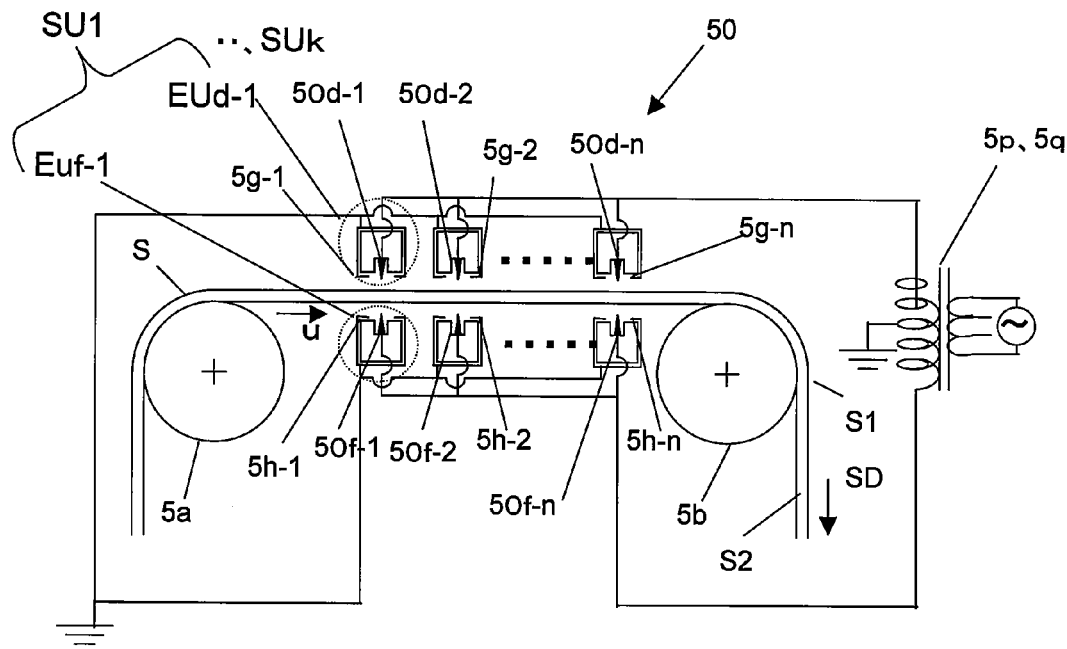
FIG. 10 shows a schematic side view of still another typical electrical insulating sheet static elimination apparatus that is preferable for use in the coating apparatus of the invention.
Figure 11:
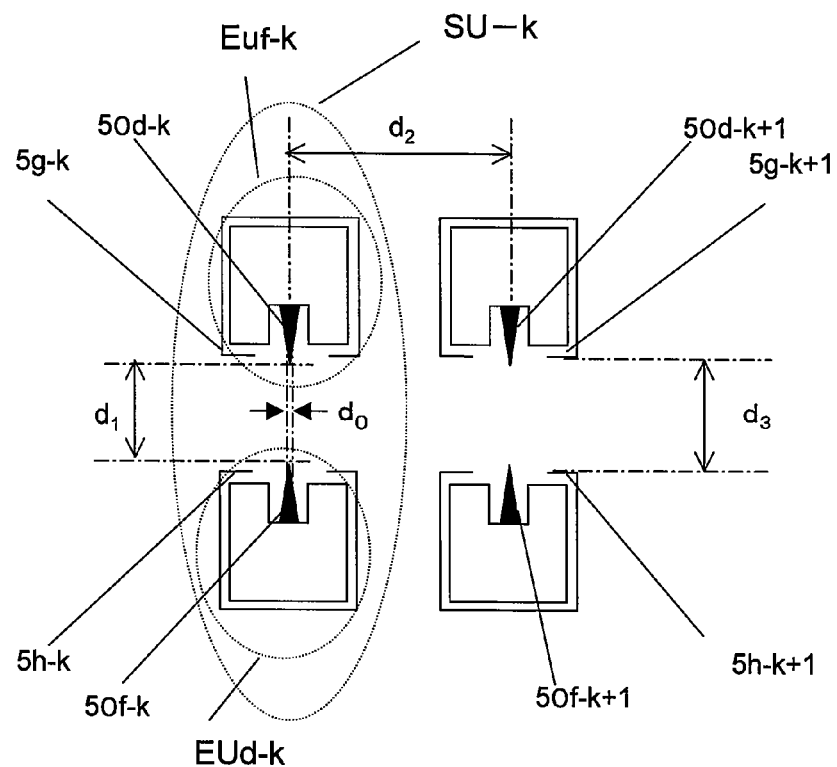
FIG. 11 shows an enlarged schematic side view of a part of the electrical insulating sheet static elimination apparatus given in FIG. 10.

FIGS. 10 and 11 show a typical static elimination apparatus designed to carry out this static elimination method. This static elimination method and this static eliminator have already been disclosed in Patent document 7. FIG. 10 shows a schematic side view of a longitudinal cross section of a static elimination apparatus 50, while FIG. 11 shows an enlarged schematic view of a longitudinal cross section of a static eliminating unit of the static elimination apparatus 50, which illustrates the configuration of major components.

As shown in FIGS. 1, 4, 6 and 7, a sheet charging apparatus, a coating liquid supply apparatus, and a coating layer smoothing apparatus are located upstream in a traveling direction SD of a sheet S from the static eliminator 50 given in FIG. 10. As shown in FIG. 10, the static eliminator 50 is produced by replacing the direct current power supply 5c and the direct current power supply 5e of the sheet charging apparatus given in FIG. 8 with an alternating current power supply 5p and an alternating current power supply 5q, and configuring it so that an alternating current having the opposite polarity is applied to the third and the fourth ion generation electrode of each static eliminating unit.

Simply described next is the action of the static eliminator 50 shown in FIGS. 10 and 11. The action of the static eliminating unit SUk described, focusing as a representative on the first static eliminating unit SU1 located most upstream in the sheet's traveling direction. In the first static eliminating unit SU1, an alternating current having a repeatedly inverted polarity is applied to the third ion generation electrode 50d-1 and the fourth ion generation electrode 50f-1, and positive and negative ions are produced by the third and the fourth ion generation electrode according to the repeated polarity inversion.

Described below is a case where a positive voltage is applied to the third ion generation electrode 50d-1 while a negative voltage is applied to the fourth ion generation electrode 50f-1. Here, positive ions are generated by the third ion generation electrode 50d-1 while negative ions are generated by the fourth ion generation electrode 50f-1. If there is a strong electric field between the third ion generation electrode 50d-1 and the fourth ion generation electrode 50f-1, the electric field works to irradiate positive and negative ions forcedly to the electrical insulating sheet S. The positive ions released from the third ion generation electrode 50d-1 and the negative ions released from the fourth ion generation electrode 50f-1 are attracted along the electric force lines produced by the opposed third and fourth ion generation electrodes 50d-1 and 50f-1, respectively, toward the neighborhood of the electrical insulating sheet S, and finally adhered to the electrical insulating sheet S. Here, in the neighborhood of the electrical insulating sheet S that have positive and negative charges on its first surface S1 and second surface S2, a larger number of positive and negative ions will be attracted selectively by the Coulomb's force toward the negative and positive electrostatic charges, respectively, on the electrical insulating sheet S if such negative and positive electrostatic charges exist there. Accordingly, negative charges on the first surface S1 of the electrical insulating sheet S and positive charges on its second surface S2 are eliminated.

Then, with the phase inversion of the alternating current applied to the third and the fourth ion generation electrode of each eliminating unit, a negative voltage is applied to the third ion generation electrode 50*d*-1 while a positive voltage is applied to the fourth ion generation electrode 50*f*-1, so that ions with the opposite polarity to the previous ones are generated by the third and the fourth ion generation electrode, and by the same mechanism as above, negative charges on the first surface S1 of the electrical insulating sheet S and positive charges on its second surface S2 are eliminated. As this process is repeated, positive and negative electrostatic charges on the two surfaces of the electrical insulating sheet S are eliminated. This will finally achieve sufficient static elimination from the electrical insulating sheet S. The static eliminator 50 given in FIG. 10, in particular, serves effectively for static elimination in the cases where the electrical insulating sheet S moves at a low speed, and positive and negative charges are removed properly by the static eliminator 50 from the entire surfaces of the electrical insulating sheet S.

The static elimination method described next is also used preferably. While moving the electrical insulating sheet S, pairs of ion clouds substantially with the opposite polarities that are unchanged with time are irradiated simultaneously to the sheet S from the first surface S1 side and the second surface S2 side of the sheet S, and then pairs of ion clouds substantially with the inverted polarities that are opposite to the former and unchanged with time are irradiated simultaneously to the first surface S1 and the second surface S2. With this static elimination method, the amount of irradiated ions of a polarity is substantially equal to that of the opposite polarity.

In a static eliminator to carry out this static elimination method, the direct current power supply 5*c* of the sheet charging apparatus given in FIG. 8 is connected to some of the third and fourth ion generation electrodes of the several static eliminating unit, while the direct current power supply 5*e* is connected with the remaining third and fourth ion generation electrodes, so that a direct current having the opposite polarity is applied alternately to the third and fourth ion generation electrodes.

Figure 12:
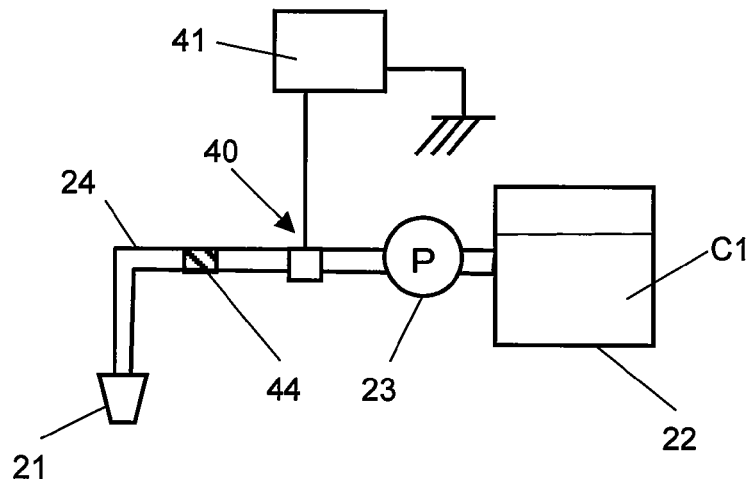
FIG. 12 shows a schematic side view of a typical electrical insulating liquid electrification apparatus that is preferable for use in the coating apparatus of the invention.
Figure 13:
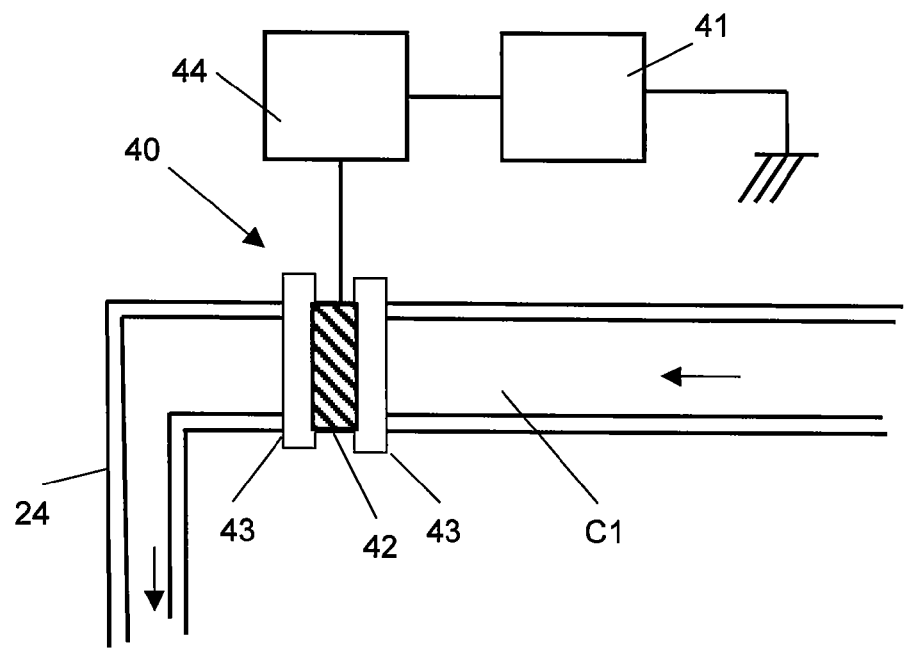
FIG. 13 shows an enlarged schematic side view of a part of the electrical insulating liquid electrification apparatus given in FIG. 12.

A typical coating liquid electrification apparatus for the coating apparatus of the invention is described in detail below with reference to FIGS. 12 and 13. FIG. 12 shows a schematic side view of a typical coating liquid electrification apparatus, while FIG. 13 shows an enlarged schematic side view of a part of the coating liquid electrification apparatus given in FIG. 12. A coating liquid C1 is stored in a storage tank 22 in FIG. 12. A coating liquid supply pipe 24 is connected to the storage tank 22, and a discharging means 21 is connected with the end of the coating liquid supply pipe 24, with a pump 23 and a coating liquid electrification apparatus 40 being provided in the coating liquid supply pipe 24 running between the storage tank 22 and the discharging means 21. The coating liquid electrification apparatus 40 is connected with a high-voltage power supply 41. By the action of the pump 23, the coating liquid C1 flows through the coating liquid supply pipe 24 at a flow rate of L [m³/min], and discharged from the discharging means 21 to the sheet S (FIG. 1).

An electrification element 42 of the coating liquid electrification apparatus 40 is connected via joints 43 with the coating liquid supply pipe 24 which is an electric conductor that is electrically insulated from outside as shown in FIG. 13. If the coating liquid supply pipe 24 is an electric conductor, the joint 43 should be made of an electric insulator. If the coating liquid supply pipe 24 is an electric insulator, the joint 43 may be either an electric conductor or an electric insulator.

The electrification element 42 of the coating liquid electrification apparatus 40 may be located in a straight portion, curved portion or T-shaped portion of the coating liquid supply pipe 24. At any position, it can be located away from the discharging means 21 of the coating liquid C1, it will be easy to incorporate the coating liquid electrification apparatus 40. If the coating apparatus 10 (FIG. 1) is provided in an explosion-proof area to discharge the coating liquid C1, in particular, it will not necessary to provide a high voltage zone in the explosion-proof area to ensure safe operation. Thus, this is preferable in many cases.

The electrification element 42 of the coating liquid electrification apparatus 40 should preferably meet the relation $0.02 \leq k/h \leq 20$, where h [mm] denotes the length in the cross section that is perpendicular to the flow direction of the coating liquid in the portion in contact with the electrical insulating coating liquid and k [mm] denotes the length in the flow direction of the coating liquid.

An electrification detection means 44 that detects the electrification of the coating liquid C1 uses, for example, a method that employs an electrification detection electrode provided in the coating liquid supply pipe 24 to measure the electric potential of the coating liquid C1, or another method that measures the electric potential of an electrically insulated conducting electrode. Specifically, depending on the length in the direction perpendicular to the flow of the coating liquid C1 in the coating liquid supply pipe 24, an electrification detection electrode made of an electric conductor having a diameter of 2 mm and a length 50 mm is inserted in the coating liquid supply pipe 24 to allow it to be located in the central region. The electric potential of this electrification detection electrode relative to a 0 V grounded point is measured and converted into the amount of charges to determine the polarity and the amount of charges of the coating liquid C1.

This charged detect method for the coating liquid C1 can perform continuous on-line monitoring of the electric potential of the coating liquid C. Using the monitoring capability, the polarity of the coating liquid C1, for example, can be detected upstream from the electrification element 42 of the coating liquid electrification apparatus 40 to permit on-line control of the polarity and the voltage of the power that is applied to the electrification element 42 by the high-voltage power supply 41. It is also possible to detect the charged state of the coating liquid C1 downstream from the electrification element 42 of the coating liquid electrification apparatus 40 to determine whether the required polarity and a required amount of charges are achieved. Specifically, if the detected amount of charges of the coating liquid C1 is too small, the amount of charges of the coating liquid C1 can be adjusted by increasing the voltage applied by the high-voltage power supply 41.

Though the principle of efficient electrification of the coating liquid C1 has not been clarified, the mechanism of the electrification can be presumed as follows. If a high voltage is applied to the coating liquid supply pipe 24 that carries the coating liquid C1, the electrical insulating coating liquid forms an electrical double layer in the neighborhood of the wall surface of the coating liquid supply pipe 24 as it passes through the electrification element 42 of the coating liquid electrification apparatus 40. The electrification element 42 is connected with the high-voltage power supply 41 and its electric potential is constant. So, the carrier's drift current and the diffusion current will be well balanced in the electrical double layer. It is inferred, however, that in the coating liquid supply pipe 24, pulsating flows of the coating liquid C1 and laminar flows of the coating liquid C1 will be caused by the pump 23 and will work to prevent the electrical double layer from being stabilized, making the drift currents and diffusion currents unbalanced and causing charges to be injected into the coating liquid C1 from the electrification element 42 to electrify the coating liquid C1.

Described next is the high voltage power to be applied to the electrification element 42 of the coating liquid electrification apparatus 40. The flammable vapor generated from the coating liquid can be ignited by electrostatic discharge. Depending on the type of the flammable vapor, the corona discharge energy can exceeds its minimum ignition energy, and the applied voltage should be so small that corona discharge will not be generated. Corona discharge is likely to occur at a portion with a pointed tip or at an edge. Generally, corona discharge can be caused when a voltage above 3 kV is applied. So, the voltage applied to the electrification element 42 should preferably be 3 kV or less, more preferably 2 kV or less.

Figure 14:
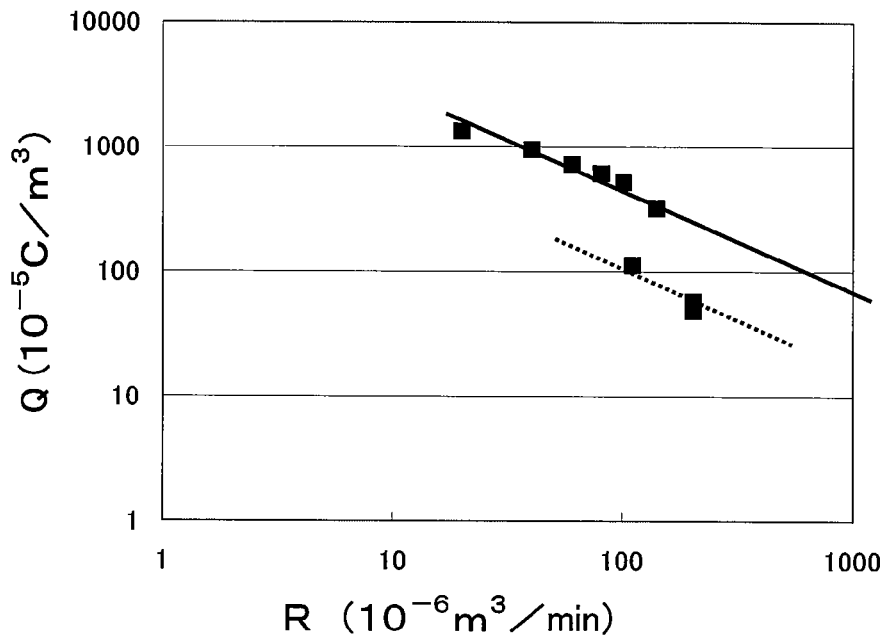
FIG. 14 shows a graph that illustrates the relationship between the applied voltage and the charged state of an electrical insulating liquid for an example of the coating apparatus of the invention.

The graph in FIG. 14 shows results of the electrification of the coating liquid C1 by the coating liquid electrification apparatus. The graph in FIG. 14 illustrates the relations between the flow rate R of the coating liquid C1 and the amount of charges Q. The horizontal and longitudinal axes represent the flow rate R [$10^{-6}$ m$^3$/min] of the coating liquid C1 and the amount of charges Q [$10^{-5}$ C/m$^3$] in the coating liquid. In FIG. 14, the continuous line and the dotted line show results produced at an applied voltage of 2 kV and 1 kV, respectively. These data were obtained under the following conditions. The high-voltage power supply 41 was used to apply a voltage to the electrification element 42 which is made of a ring-like conductor having the same diameter as the coating liquid supply pipe 24. The coating liquid C1 used was an acrylic emulsion that forms a hard coat when dried, and it was an electrical insulating liquid. The coating liquid C1 was fed by the pump 23 from the storage tank 22 into the coating liquid supply pipe 24, and then the coating liquid C1 was supplied to the discharging means 21 at a flow rate of $2 \times 10^{-5}$ to $2 \times 10^{-4}$ [m$^3$/min] while coming in contact with the electrification element 42. The above-mentioned Faraday cage was used to measure the difference in the amount of charges in the coating liquid C before and after passing the electrification element 42.

As clearly seen from the graph in FIG. 14, the electrical insulating coating liquid C1 is forcedly charged as it passes on the electrification element 42 of the coating liquid electrification apparatus 40. The amount of charges in the coating liquid C1 is much larger than the amount of charges caused by frictional electrification due to contact with coating liquid discharge pipe 24 and storage tank 22. This means that efficient electrification of the coating liquid C1 can be achieved by the simple means of actively applying a voltage on the coating liquid C1 using a part of the coating liquid supply pipe 24.

The polarity of the coating liquid C1 can be adjusted to be the same as the polarity of the voltage applied by the coating liquid electrification apparatus 40. The amount of electric charges in the coating liquid C1 increases with an increasing applied voltage, and the amount of charges increases with a decreasing flow rate of the coating liquid C1. If a large flow rate of the coating liquid C1 is necessary for the coating liquid supply apparatus 20, the flow of the coating liquid C1 may be divided temporarily into several channels and the flow rate of the coating liquid C1 in each flow channel may be decreased so that a required amount of charges in the coating liquid C1 can be easily achieved. Thus, in the coating liquid electrification apparatus 40, the flow of the coating liquid can be divided and one or more of the divided coating liquid flow channels can be used for electrification. Subsequently, the flows of the charged coating liquid may pass through separate channels or may be combined, before being discharged from the coating liquid discharging means and applied to the sheet.

A protective resistor 44 may be provided between the electrification element 42 of the coating liquid electrification apparatus 40 and the high-voltage power supply 41. If a high voltage direct current from the high-voltage power supply 41 is used, in particular, such a protective resistor 44 prevents excessive current from being applied to the system in case of a short circuit, ensuring safe electrification operations for the coating liquid C1. Generally, it is not desirable for a current of 1 mA or more to flow out of the system as a result of a sudden short circuit, and therefore, the protective resistor 44 that limits the absolute value of the applied voltage should preferably be provided so that the current will be maintained at 1 mA or less. If the protective resistor 44 having a very large resistance is used, the applied voltage will decrease quickly when a minute current occurs, and the value of resistance should preferably be in the range of about 2 MΩ to 10 MΩ. The existence of the protective resistor 44 has no influence on the charged state of the coating liquid C1, and so the protective resistor 44 can be used effectively, depending on requirements.

Described next are examples and comparative examples of the application of a coating liquid to an electrical insulating sheet using the coating apparatus of the invention. The various evaluation methods used in the examples and comparative examples are as follows.

Evaluation Method for Shape of Liquid Pool CP:
   Using a film as the electrical insulating sheet S, the shape of the liquid pool CP which formed in the gap between the film and the coating bar 31 and had a curved surface was observed visually for 30 seconds, and evaluation was carried out according to the following two step criteria.

Stable: The shape of the liquid pool CP is stable and does not undergo significant changes with time. Periodically vibrations or sudden deformation are not seen in this state.

Unstable: The shape of the liquid pool CP does not remain constant and suffers significant changes with time.

Evaluation Method for Uneven Coating:
   Using a film as the electrical insulating sheet S, the coating liquid C1 was applied over the film, and observation was performed to see if there was uneven coating, or a region where the coating thickness of the coating liquid varies locally. The existence of uneven coating was checked visually after the sheet S had passed through the coating apparatus, and evaluation was carried out according to the following two step criteria.

Good: Free of uneven coating
Inferior: Suffering uneven coating
Inspection method for apparently non-charged state:
   Inspection was performed to see if there was adhesion of toner. The sheet S was placed at a position sufficiently away as compared with the thickness of the sheet S, for example by a distance more than 100 times larger than the thickness of the sheet S, from a ground conductor, and electrophotographic toner was sprinkled over the sheet S, followed by inspection of local adhesion of toner.

As stated above, toner tends to adhere to portions of the sheet S where the apparent charge density is high. Normally, adhesion of toner will occur if the sheet S undergoes local charge pattern and has an absolute value of the apparent charge density of 2 μC/m$^2$ or more. This means that a sheet S free of local adhesion of toner should contain no local regions where the absolute value of the apparent charge density is 2

μC/m² or more. Adhesion of toner was checked and evaluation was carried out according to the following two step criteria.

Good: The sheet S is free of adhered toner, and is in an apparently non-charged state.

Inferior: The sheet S has adhered toner, and is not in an apparently non-charged state.

Measurement method for rear side equilibrium potential for each surface of electrical insulating sheet S:

To prepare the electrical insulating sheet S, a sheet S was charged before starting the coating operation. For evaluation, the electric potential in a surface of the electrical insulation the sheet S was measured with the opposite surface held in contact with a metal roll (hard chrome plated roll having a diameter of 10 [cm]). During the measurement, the sheet S should be in close contact with the metal roll, leaving substantially no gap between them. In this state, an electrometer (Model 244 manufactured by Monroe Electronics Inc.) was placed with the sensor (Probe 1017EH manufactured by Monroe Electronics Inc., opening diameter 0.5 [mm]) located at 0.5 [mm] from the surface of the sheet S, and the electric potential was measured while rotating the metal roll slowly to determine the rear side equilibrium potential v [V]. When the sensor is located 0.5 [mm] away as above, the field of view will have a diameter of 0.25 [mm] or less according to the catalog supplied by Monroe Electronics Inc. For the slow rotation of the roll, a linear motor was used to maintain a rotation speed of about 0.3 [mm/min].

For the measurement of the rear side equilibrium potential within the surface plane of the sheet S, the electrometer was moved for scanning over a distance of about 20 mm in the width direction of the sheet S to determine the position where the maximum in the width direction was found. Then, with the position fixed in the width direction, the electrometer was moved for scanning in the traveling direction SD of the sheet S, that is, the longitudinal direction of the sheet S, while measuring the electric potential. Ideally, measurements should be carried out for all positions in a two-dimensional region to determine the rear side equilibrium potential within the surface plane of the sheet S, but normally the method described above, which is based on an approximate potential distribution within the surface plane of the sheet S, will serve effectively. If the sheet S has a width of larger than 1 m, a sheet specimen of about 200 mm is cut out from portions near the edge and near the center in the width direction of the sheet S, and the specimen is used for the measurement.

The measured distribution of the rear side equilibrium potential v [V] was used to determine the distribution of the charge density σ [μC/m²]. The charge density was calculated by the relational expression σ=C·v, where C [μF/m²] and v represent the electrostatic capacity per unit area of the sheet S and the rear side equilibrium potential. The electrostatic capacity per unit area of the sheet S, C, is determined from the electrostatic capacity per unit area of parallel flat plates which is expressed by the relational expression $C = \epsilon_0 \epsilon_r / t$, where, $\epsilon_0$, $\epsilon_r$, and t denote the dielectric constant in vacuum or $8.854 \times 10^{-12}$ [F/m], dielectric constant of the sheet (assumed to be 3), and thickness of the sheet [m], respectively. To determine the rate of change in the charge density, furthermore, the charge density distribution curve was differentiated with respect to the length within the surface plane of the sheet S to calculate the maximum of the rate of change. Evaluation of the charged state was carried out according to the following two step criteria.

Good: A charged state where the difference between maximum and minimum of the absolute value of the rear side equilibrium potential is 340V or less, and at the same time, the rate of change in the charge density is 0.18 [C/m²/m] or less.

Inferior: A charged state where either the difference between maximum and minimum of the absolute value of the rear side equilibrium potential is 340V or more, or the rate of change in the charge density is 0.18 [C/m²/m] or more.

Measurement method (simple method) for resistance of coating liquid C1:

About 50 ml of the coating liquid C1 is poured and allowed to spread in an insulating container. Two measurement terminals (diameter 2 mm, length 50 mm) 50 mm away from each other are placed in parallel in the coating liquid C1. A direct current of 15V was applied between the terminals and the value of resistance [Ω] was measured. A Worksurface Tester manufactured by Simco Japan, Inc. was used for the measurement which was carried out at 25° C.±1° C.

Measurement Method for Amount of Charges in Coating Liquid C1:

A Faraday cage was use to measure the amount of charges in the coating liquid C1. A Nano Coulomb's Meter Model 284 manufactured by Monroe Electronics was employed as Faraday cage. A branch from the coating liquid supply pipe 24 for the coating liquid C1 was provided and a total amount of $0.3 \times 10^{-3}$ [m³] of the coating liquid C1 was taken out at a flow rate of 0.02 to $0.2 \times 10^{-3}$ [m³/min] and supplied to the Faraday cage to measure the amount of charges. Measurements were taken at room temperature.

Measured Method for Viscosity of Coating Liquid C1:

About 200 ml of the coating liquid C1 was poured in a container, and a Type B viscometer (single cylinder rotational viscosity Rotor No. 4 manufactured by Tokyo Keiki Co., Ltd., JISZ8803 (1991)) was inserted in the coating liquid C1 in the container. The rotor was rotated at a rotation speed of 20 [revolutions/min], and the viscosity [mPa·s] was measured.

EXAMPLE 1

A molten polyethylene terephthalate was extruded through a film extrusion orifice onto a casting drum, and cooled on the casting drum to produce a film, and then the film was stretched three times in the moving direction to provide a uniaxially stretched film. The uniaxially drawn film was used as a film (electrical insulating sheet) S and supplied to the coating apparatus 10a given in FIG. 7 at a traveling speed of 25 m/min. Thus, a coating of the film S with the coating liquid was performed in an in-line process. This uniaxially stretched film ("Lumiror" manufactured by Toray Industries, Inc.) had a width of about 1000 [mm] and a thickness of 350 [μm].

After the film S has passed through the sheet charging apparatus 5 which is described later, the coating liquid C2 was applied to the second surface S2. This coating of the second surface S2 with the coating liquid C2 was carried out by discharging the coating liquid C2 onto the second surface S2 from the discharging means 21a of the coating liquid supply apparatus 20a. A coating layer CL2 was produced on the second surface S2 as result of this coating of the second surface S2 with the coating liquid C2. A coating liquid based on a water-soluble, easily adherable material was used as the coating liquid C2.

The coating liquid C1 was applied on the first surface S1 immediately after the coating layer CL2 was formed on the second surface S2. This application of the coating liquid C1 on the first surface S1 was carried out by discharging the coating liquid C1 onto the first surface S1 from the discharging means 21 of the coating liquid supply apparatus 20. A nozzle array type discharging means that comprises nozzles having a coating liquid discharging port having an inner diameter of 2 mm and aligned at intervals of 40 mm (nozzle alignment interval) in the coating width direction was used as the discharging means 21. A diaphragm pump (manufactured by Tacmina Corporation, ripple factor 3.5% or less) that can discharge the coating liquid at a constant rate was used as the pump 23 which is provided in the coating liquid supply pipe 24 that connects the discharging means 21 to the storage tank 22 of the coating liquid C1. The discharge rate to supply the coating liquid C1 to the discharging means 21 was adjusted to 0.24 m$^3$/min. A thermostat was provided in the coating liquid supply pipe 24 which adjusts the temperature of the coating liquid C1 to maintain a required viscosity.

A coating bar comprising a bar having a diameter of 19 mm and a length of 1200 mm wound closely with a wire having a diameter of 0.356 mm was used as the coating bar 31 of the coating layer smoothing apparatus 30. The coating bar 31 was set such that it presses the film S perpendicular to the traveling direction SD of the film S as shown in FIG. 7.

The coating liquid C1 was supplied from the discharging means 21 directly onto the surface of the liquid pool CP1 which has been formed in the gap between the coating bar 31 and the film S. The system was configured so that the coating liquid would fall over a distance of 40 mm from the discharging means 21 to the surface of the liquid pool CP1. The coating width of the coating liquid applied on the first surface S1 was adjusted to 380 mm, and the coating liquid C1 was applied to the central region of film S.

The type and physical characteristics of the coating liquid C1 used were as follows.

Acrylic Emulsion Type Coating Liquid with Solids Content of 3% by Weight
  Volume resistivity of coating liquid: 10$^9$ Ω·cm
  Surface tension of coating liquid: 50 [mN/m]
  Viscosity of coating liquid: 700 [mP·s], measured for coating liquid at 30° C.±2
  Coating thickness of coating liquid: 25 µm before dried for solidification of coating liquid; 7 µm after dried for solidification of coating liquid A sheet charging apparatus comprising opposed electrodes as shown in FIGS. 8 and 9 was used as the sheet charging apparatus 5 to charged the film S. It was set so that the electrodes were held perpendicular to the traveling direction SD of the film S and parallel to the surface of the film S, with the film S located in between. The number N of charging units was 2. The distance d1 between the tip of the upper ion generation electrode and that of the lower ion generation electrode was adjusted to 35 [mm]. The film S was controlled so that it would pass through about the center between the electrodes. The ion generation electrodes neighboring in the traveling direction SD of the film S were located so that the distance d2 between their tips would be 55 [mm].

As the power supplies 5c and 5e that are connected with the ion generation electrodes 5d and 5f, direct current power supplies were used and they were connected so that the supplied power from each supply would have the opposite polarity. Appropriate polarities of the applied power were selected so that the first surface S1 would have a positive polarity. The direct current power supply used had a ripple factor of 5% or less. Two levels of applied voltage, 4.5 [kV] and 6.0 [kV], were applied respectively to the first and the second ion generation electrode, and both shield electrode 5g and 5h were grounded. A positive voltage was applied to the first ion generation electrode of every charging unit while a negative voltage was applied to the second ion generation electrode of every charging unit, to ensure that the first surface S1 and the second surface S2 would be charged uniformly with the opposite polarities.

The coating liquid C1 is charged positively, and the coating liquid C1 had an electric charge of +20×10$^{-5}$ [C/m$^3$]. Electrification of the coating liquid C1 was achieved by the frictional electrification with the coating liquid supply pipe 24 etc., and therefore, application of a high voltage to the coating liquid electrification apparatus 40 was not performed, that is, the applied voltage was 0 V.

The sheet static eliminator 50 comprising opposed electrodes as shown in FIGS. 10 and 11 was placed downstream from the coating bar 31. It was set so that the electrodes would be perpendicular to the traveling direction SD of the film S and at the same time parallel to the surface of the film S, with the film S located in between. The number N of static eliminating units was 2. The distance d1 between the tip of the upper ion generation electrode and that of the lower ion generation electrode was adjusted to 35 [mm]. The film S was controlled so that it would pass through about the center between the electrodes. The ion generation electrodes neighboring in the traveling direction SD of the film S were located so that the distance d2 between their tips would be 55 [mm].

As the power supplies 5p and 5q that are connected with the ion generation electrode 50d and 50f, alternating current power supplies having a frequency of 60 Hz were used and they were connected so that the supplied power from each supply would have the opposite phase. A voltage with an effective value of 7.0 [kV] was applied to the third and the fourth ion generation electrode, and both shield electrode 5g and 5h were grounded. Alternating currents having an effective value of 7.0 [kV] in the (180°) reverse phases were applied to the third and the fourth ion generation electrode of each static eliminating unit.

Application of the coating liquid C1 was carried out after both the coating liquid C1 and the first surface S1 of the film S had been charged positively. The liquid pool CP1 was stabilized, and the coating layer CL1 on the first surface S1 was free of uneven coating of the coating liquid C1. Characteristics of the film S obtained in Example 1 are listed in Table 1.

EXAMPLE 2

Coating of the film S with the coating liquid C1 was carried out by the same procedures as in Example 1 except that the conditions for Example 2 shown in Table 1 were used instead of the conditions for Example 1 shown in Table 1. Characteristics of the film S obtained in Example 2 are listed in Table 1.

Comparative Example 1

Coating of the film S with the coating liquid C1 was carried out under the same conditions as in Example 1 except that high voltage was not applied to the sheet charging apparatus 5 and that the first surface S1 of the film S was in a non-charged state. Characteristics of the film S obtained in the Comparative Example 1 are listed in Table 1.

Comparative Example 2

Coating of the film S with the coating liquid C1 was carried out under the same conditions as in Example 1 except that the sheet charging apparatus 5 was used to charge the first surface S1 of the film S to have the opposite polarity to that of the coating liquid C1. Characteristics of the film S obtained in the Comparative Example 2 are listed in Table 1.

TABLE 1

|  | Absolute value of applied voltage to sheet charging apparatus 5 [kV] | Polarity of first surface of the sheet | Amount of charge in first surface of the sheet [$\mu$C/m$^2$] | Amount of charge in coating liquid [$10^{-5}$ C/m$^3$] |
|---|---|---|---|---|
| Example 1 | 4.5 | positive | +70 | +20 |
| Example 2 | 6 | positive | +150 | +20 |
| Comparative Example 1 | 0 | non-charged | +10 | +20 |
| Comparative Example 2 | 6 | negative | −150 | +20 |

|  | Evaluation of apparently non-electrified state | State of rear side equilibrium potential in each surface | State of shape of liquid pool | Evaluation of uneven coating |
|---|---|---|---|---|
| Example 1 | good | good | stable | good |
| Example 2 | good | good | stable | good |
| Comparative Example 1 | inferior | inferior | unstable | inferior, flow mark |
| Comparative Example 2 | good | good | unstable | inferior, flow mark |

As seen from Table 1, the first surface S1 of the film S in Examples 1 and 2 has the same polarity as that of the coating liquid C1 supplied to the first surface S1. The liquid pool CP1 was stabilized and uneven coating did not take place, indicating that coating with the coating liquid had been carried out properly. As shown in Comparative Example 1, on the other hand, the liquid pool CP1 was unstable and the liquid pool CP1 became partially smaller or larger if the film S was not charged with the same polarity. As a result, flow marks, which indicate uneven coating of the coating liquid, were formed in the coating layer CL1. As seen from the Comparative Example 2, furthermore, if the film S and the coating liquid C1 were charged to have the opposite polarities, the liquid pool CP1 was unstable, and the liquid pool CP1 was attracted by the Coulomb's attraction toward the charges on the film S, easily leading to partial decrease in size of the liquid pool CP1. This resulted in the formation of flow marks, an indication of uneven coating of the coating liquid.

Comparative Example 3

A molten polyethylene terephthalate was extruded through a film extrusion orifice onto a casting drum, and cooled on the casting drum to produce a film, and then the film was drawn three times in the longitudinal direction to provide a uniaxially stretched film. The uniaxially stretched film was used as a film (electrical insulating sheet) S and supplied to the coating apparatus 10a given in FIG. 7 at a traveling speed of 25 m/min. Thus, the coating of the film S with the coating liquid was performed in an in-line process. The second surface S2 was coated with the coating liquid C2 as in Example 1. A coating liquid based on a water-soluble, easily adherable material was used as the coating liquid C2.

This Comparative Example did not use the sheet charging apparatus 5 for corona discharge of the film S and the sheet static eliminator 50, but the conventional corona discharge treatment apparatus 151 for film electrification shown in FIG. 15 was employed instead. This corona discharge treatment apparatus 151 was located at the position of the sheet charging apparatus 5 shown in FIG. 7. A voltage of 15 kV was applied to the corona discharge treatment electrode 153, and the grounded counter electrode roll 152 was adjusted to a voltage of 0 V. The film S was exposed to the corona discharge space to improve the wettability of the surface of the film S, and at the same time, unipolar charges were given to the surface of the film S. A static eliminator was placed between the corona discharge treatment apparatus 151 and the coating apparatus 10a to perform static elimination from the film S. The static eliminator consisted of an array of ten electrode-applying type static eliminator elements which was placed on one side of the film S. A voltage with an effective value of 7 [kV] was applied to the static eliminator using an alternating current power supply having a frequency of 60 [Hz]. The other conditions were the same as in Example 1 in coating the film S with the coating liquid C1. Characteristics of the film S obtained in the Comparative Example 3 are listed in Table 1.

Comparative Example 4

Coating of the film S with the coating liquid C1 was carried out by the same procedures as in the Comparative Example 3 except that the conditions for the Comparative Example 4 shown in Table 2 were used instead of the conditions for the Comparative Example 3 shown in Table 2. Characteristics of the film S obtained in the Comparative Example 4 are listed in Table 2.

Comparative Example 5

Coating of the film S with the coating liquid C1 was carried out by the same procedures as in Comparative Example 3 except that the conditions for Comparative Example 5 shown in Table 2 were used instead of the conditions for Comparative Example 3 shown in Table 2. Characteristics of the film S obtained in Comparative Example 5 are listed in Table 2.

TABLE 2

| | Polarity of first surface | Applied voltage for one-side static elimination [kV] | Amount of charge in coating liquid [$10^{-5}$ C/m$^3$] |
|---|---|---|---|
| Comparative Example 3 | negative | 0 | +20 |
| Comparative Example 4 | positive | 0 | +20 |
| Comparative Example 5 | positive | 7 | +20 |

| | Evaluation of apparently non-charged state | State of rear side equilibrium potential in each surface | State of shape of liquid pool | Evaluation of uneven coating |
|---|---|---|---|---|
| Comparative Example 3 | inferior | inferior | unstable | inferior, flow mark Uneven coating caused by electrification |
| Comparative Example 4 | inferior | inferior | unstable | inferior Uneven coating caused by electrification |
| Comparative Example 5 | good | inferior | unstable | inferior Uneven coating caused by electrification |

As seen from Table 2, the film S and the coating liquid C1 were charged to have the opposite polarities in Comparative Example 3, resulting in an unstable liquid pool CP1 and formation of flow marks. Generally, a film S subjected to corona discharge treatment tends to have a negative aerial potential, and it is difficult to allow the film to have the same polarity as that of the coating liquid C1. Furthermore, the film S was not in a favorable apparently non-charged state, and its surfaces were also not in a favorable state with respect to the rear side equilibrium potential. Thus, uneven coating resulted from local site of charge in the surfaces.

As seen from Comparative Examples 4 and 5, if the film S and the coating liquid C1 have the same polarity, the liquid pool CP1 tends to be more stable than that in Comparative Example 1, but it is impossible to stabilize the liquid pool CP1 completely. This is because the electrification was carried out by using corona discharge treatment, and therefore, the distribution of charges was not uniform in the traveling direction SD of the film S. The shape of the liquid pool CP1 changes depending on the amount of charges. As expected, the liquid pool CP1 was not stabilized and flow marks were formed. The frequency of flow mark formation was lower than in the case of Comparative Example 1. Furthermore, the surfaces of the film S was not in a good charged state with respect to the rear side equilibrium potential, and uneven coating resulted from local site of charge in the surfaces of the film S.

EXAMPLE 3

A molten polyethylene terephthalate was extruded through a film extrusion orifice onto a casting drum, and then the film was stretched three times in the longitudinal direction to provide a uniaxially stretched film. The uniaxially stretched film was used as film (electrical insulating sheet) S and supplied to the coating apparatus 10a given in FIG. 7 at a traveling speed of 25 m/min. Thus, the coating of the film S with the coating liquid was performed in an in-line process. This uniaxially stretched film ("Lumiror" manufactured by Toray Industries, Inc.) had a width of about 1000 [mm] and a thickness of 300 [mm].

After the film S has passed through the sheet charging apparatus 5 which is described later, the coating liquid C2 was applied to the second surface S2. This coating of the second surface S2 with the coating liquid C2 was carried out by discharging the coating liquid onto the second surface S2 from the discharging means 21a of the coating liquid supply apparatus 20a. A coating layer CL2 was formed on the second surface S2 as result of this coating of the second surface S2 with the coating liquid C2. A coating liquid based on a water-soluble, easily adherable material was used as the coating liquid C2. This water-soluble, easily adherable material may be terephthalic acid, isophthalic acid, ethylene glycol, etc. This water-soluble, easily adherable material was diluted with water to a solids content of 3% by weight to provide the coating liquid C2.

The coating liquid C1 was applied over the first surface S2 immediately after the coating layer CL2 was formed on the second surface S2. This application of the coating liquid C1 over the first surface S1 was carried out by discharging the coating liquid C1 onto the first surface S1 from the discharging means 21 of the coating liquid supply apparatus 20. A nozzle array type discharging means that consists of nozzles having a coating liquid discharging port with a inner diameter of 2 mm and aligned at intervals of 40 mm (nozzle alignment interval) in the coating width direction was used as the discharging means 21. A pump that can discharge the coating liquid at a constant rate was used as the pump 23 which is provided in the coating liquid supply pipe 24 that connects the discharging means 21 to the storage tank 22 of the coating liquid C1. The coating of the first surface S1 with the coating liquid C1 was carried out as in Example 1 while changing the temperature of the coating liquid C1 so that the viscosity vary in the range of 450 to 2000 [mP·s].

The type and physical characteristics of the coating liquid C1 are as follows.

Acrylic emulsion type coating liquid having solids content of 3% by weight

Resistance of coating liquid: 109 Ω·cm

A charging apparatus comprising opposed electrodes as shown in FIGS. 8 and 9 was used as the sheet charging apparatus 5 to electrify the film S. It was set so that the electrodes were held perpendicular to the traveling direction SD of the film S and parallel to the surface of the film S, with the film S located in between. The number N of charging units was 2. The distance d1 between the tip of the upper ion generation electrode and that of the lower ion generation electrode was adjusted to 35 [mm]. The film S was controlled so that it would pass through about the center between the electrodes. The ion generation electrodes neighboring in the traveling direction SD of the film S were located so that the distance d2 between their tips would be 55 [mm].

As the power supplies 5c and 5e that are connected with the ion generation electrodes 5d and 5f, direct current power supplies were used and they were connected so that the supplied power from each supply would have the opposite polarity. Appropriate polarities of the applied power were selected so that the first surface S1 would have a positive polarity. Both shield electrode 5g and 5h were grounded. A voltage of −5 to +5 [kV] was applied to the first ion generation electrode of every charging unit while a voltage of −5 to +5[kV] was applied to the second ion generation electrode of every charging unit, to ensure that the first surface S1 and the second surface S2 would be charged uniformly with the opposite polarities.

The amount of charges in the coating liquid C1 was $-4 \times 10^{-5}$ [C/m$^3$]. The charging of the coating liquid C1 resulted from frictional charging with the coating liquid supply pipe 24 etc. Coating was performed while the electrical insulating coating liquid C1 was being charged by applying a high voltage of −2 [kV] to +2[kV] to the coating liquid electrification apparatus 40 for the coating liquid C1.

The sheet static eliminator 50 comprising opposed electrodes as shown in FIGS. 10 and 11 was placed downstream from the coating bar 31. It was set so that the electrodes would be perpendicular to the traveling direction SD of the film S and at the same time parallel to the surface of the film S, with the film S located in between. The number N of static eliminating units was 2. The conditions for the static eliminator 50 were the same as in Example 1.

Application of the coating liquid was carried out after both the coating liquid C1 and the first surface S1 of the film S had been charged positively or negatively. The liquid pool CP1 was stabilized, and uneven coating did not take place. Characteristics of the film S obtained in Example 3 are listed in Table 3.

EXAMPLE 4

Coating of the film S with the coating liquid C1 was carried out by the same procedures as in Example 3 except that the conditions for Example 4 shown in Table 3 were used instead of the conditions for Example 3 shown in Table 3. Characteristics of the film S obtained in Example 3 are listed in Table 3.

EXAMPLE 5

Coating of the film S with the coating liquid C1 was carried out by the same procedures as in Example 3 except that the conditions for Example 5 shown in Table 3 were used instead of the conditions for Example 3 shown in Table 3. Characteristics of the film S obtained in Example 5 are listed in Table 3.

Comparative Example 6

Coating of the film S with the coating liquid C1 was carried out by the same procedures as in Example 3 except that the conditions for Comparative Example 6 shown in Table 3 were used instead of the conditions for Example 3 shown in Table 3. Characteristics of the film S obtained in Comparative Example 6 are listed in Table 3. The liquid pool CP1 was not stabilized and flow marks were formed when the first surface S1 and the coating liquid C1 were charged with the opposite polarities.

Comparative Example 7

Coating of the film S with the coating liquid C1 was carried out by the same procedures as in Example 3 except that the conditions for Comparative Example 7 shown in Table 3 were used instead of the conditions for Example 3 shown in Table 3. Characteristics of the film S obtained in Comparative Example 7 are listed in Table 3. The liquid pool CP1 was not stabilized and flow marks were formed when the first surface S1 and the coating liquid C1 were charged with the opposite polarities.

TABLE 3

|  | Viscosity of coating liquid [mP · s] | Absolute value of applied voltage to sheet charging apparatus 5 [kV] | Polarity of applied power to first surfce | Polarity of first surface [μC/m$^2$] |
| --- | --- | --- | --- | --- |
| Example 3 | 450 | 5 | negative | −110 |
| Example 4 | 450 | 4.1 | positive | +70 |
| Example 5 | 2000 | 5 | positive | +115 |
| Comparative Example 6 | 450 | 5 | positive | +110 |
| Comparative Example 7 | 2000 | 5 | negative | −110 |

TABLE 3-continued

|  | Amount of charge in coating liquid [$10^{-5}$ C/m$^3$] | Evaluation of apparently non-charged state | State of rear side equilibrium potential in each surface | Evaluation of uneven coating |
|---|---|---|---|---|
| Example 3 | −4 | good | good | good |
| Example 4 | +16 | good | good | good |
| Example 5 | +20 | good | good | good |
| Comparative Example 6 | −4 | good | good | inferior |
| Comparative Example 7 | +20 | good | good | inferior |

EXAMPLE 6

An insulating acrylic emulsion that forms a hard coat when dried was used as the coating liquid C1. The coating liquid C1 was charged with the coating liquid electrification apparatus 40. The coating liquid C1 used had a resistance of $10^9$ [Ω·cm]. The coating liquid C1 was supplied by the pump 23 from the storage tank 22 to the discharging means 21 through the coating liquid supply pipe 24. The flow rate of the coating liquid C1 was controlled in the range of 0.02 to $0.2\times10^{-3}$ [m$^3$/min]. A fluorine based FA tube (manufactured by Nitta Moore Company, inside diameter 10 mm, outside diameter 12 mm) was used as the coating liquid supply pipe 24.

The liquid charging apparatus 40 was constituted of conductive electrification elements 42 (FIG. 13), and is connected with the coating liquid supply pipe 24 on its front and rear sides using stainless steel (SUS) tube joints 43 and 43.

Two types of conductors, namely, tube-like (type A) and T-shaped (type B), were used the electrification element 24. The Type A conductor was a stainless steel pipe (inside diameter 10 mm, outside diameter 12 mm, length 25 mm). The Type B conductor was a pipe joint (nominally: ½, inside diameter 12.5 mm, length 40 mm, made of stainless steel), and two of this joint were used to branch and combine the flow channel. The voltage described later was applied to the T-shaped pipe at the branching portion. The Type A and Type B conductors had a k/h value of 2.5 and 3.2, respectively, where h [mm] and k [mm] denote the length in the cross section perpendicular to the flow direction of the coating liquid C1 and the length in the flow direction of the coating liquid C1, respectively. The Type A conductor was used in this Example.

A high voltage power supply was connected to the conductor portion, which was electrically insulated, and a voltage was applied. The coating liquid C1 flowing in the coating liquid supply pipe 24 is in contact with the high voltage conductor as it passes through the coating liquid supply pipe 24. The amount of charges in the coating liquid C1 was measured after passing through the coating liquid electrification apparatus 40. The amount of charges in the coating liquid C1 was $+11\times10^{-5}$ [C/m$^3$] in the case where no voltage was applied to the coating liquid electrification apparatus 40, that is, the voltage was 0 V. Table 4 shows the charged state of the coating liquid C1 used in Example 6.

EXAMPLE 7

The coating liquid C1 was electrified by the same procedures as in Example 6 except that the conditions for Example 7 shown in Table 4 were used instead of the conditions for Example 6 shown in Table 4. Characteristics of the coating liquid C1 electrified in Example 7 are listed in Table 4.

EXAMPLE 8

The coating liquid C1 was charged by the same procedures as in Example 6 except that the conditions for Example 8 shown in Table 4 were used instead of the conditions for Example 6 shown in Table 4. Characteristics of the coating liquid C1 charged in Example 8 are listed in Table 4.

EXAMPLE 9

The coating liquid C1 was charged by the same procedures as in Example 6 except that the conditions for Example 9 shown in Table 4 were used instead of the conditions for Example 6 shown in Table 4. Characteristics of the coating liquid C1 charged in Example 9 are listed in Table 4.

EXAMPLE 10

The coating liquid C1 was charged by the same procedures as in Example 6 except that the conditions for Example 10 shown in Table 4 were used instead of the conditions for Example 6 shown in Table 4. Characteristics of the coating liquid C1 charged in Example 10 are listed in Table 4.

EXAMPLE 11

The coating liquid C1 was charged by the same procedures as in Example 6 except that the conditions for Example 11 shown in Table 4 were used instead of the conditions for Example 6 shown in Table 4. Characteristics of the coating liquid C1 charged in Example 11 are listed in Table 4.

EXAMPLE 12

The coating liquid C1 was charged by the same procedures as in Example 6 except that the conditions for Example 12 shown in Table 4 were used instead of the conditions for Example 6 shown in Table 4. Characteristics of the coating liquid C1 charged in Example 12 are listed in Table 4.

EXAMPLE 13

The coating liquid C1 was charged by the same procedures as in Example 6 except that the conditions for Example 13 shown in Table 4 were used instead of the conditions for Example 6 shown in Table 4. Characteristics of the coating liquid C1 charged in Example 13 are listed in Table 4.

Comparative Example 8

Figure 16:
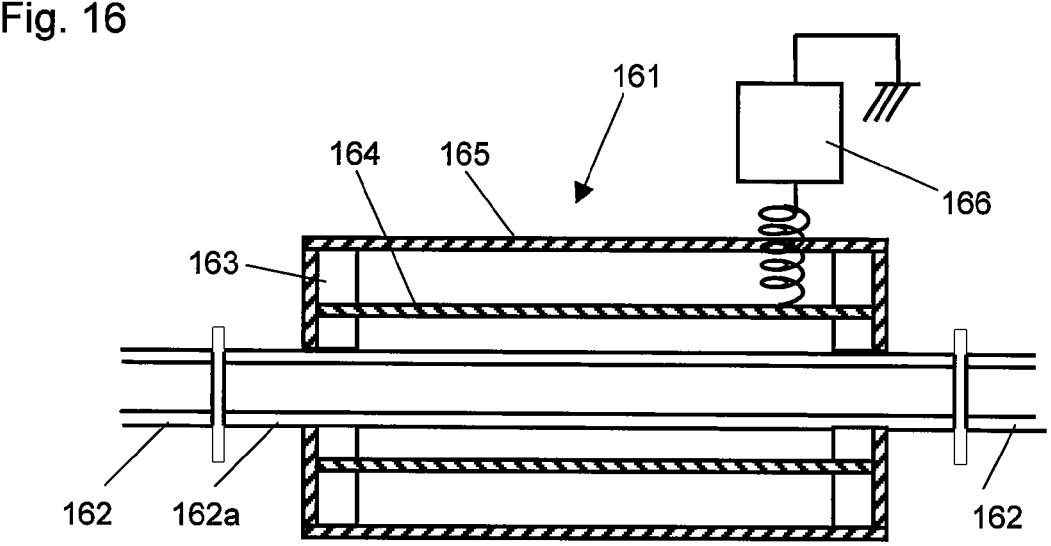
FIG. 16 shows a schematic longitudinal section view of a conventional coating liquid electrification apparatus.

An electric charge feed apparatus 161, which is based on conventional technology, given in FIG. 16 was used in the Comparative Examples 8. The insulated coating liquid supply pipe 162a was enclose by the electrode tube 164 with a distance provided between them, and the coating liquid supply pipe 162a and the electrode tube 164 were insulated by the insulator 163. A high voltage was applied to the electrode tube 164 by the high voltage power supply 166. Characteristics of the coating liquid C1 charged in Comparative Example 8 are listed in Table 4.

TABLE 4

| | Shape of conductor | Applied voltage to coatiing liquid charging apparatus [kV] | Flow rate [ml/min] | Amount of charge in coating liquid $[10^{-5} \text{ C/m}^3]$ |
|---|---|---|---|---|
| Example 6 | Type A | +1.0 | 20 | +920 |
| Example 7 | Type A | +1.0 | 50 | +280 |
| Example 8 | Type A | +1.0 | 200 | +58.1 |
| Example 9 | Type A | −1.5 | 35 | −684 |
| Example 10 | Type B | +2.0 | 100 | +524 |
| Example 11 | Type B | +2.0 | 134 | +325 |
| Example 12 | Type B | +1.0 | 108 | +115 |
| Example 13 | Type B | +1.0 | 200 | +49 |
| Comparative Example 8 | Type A | +1.0 Voltage applied to electrode tube set apart | 50 | +115 |

INDUSTRIAL APPLICABILITY

The invention is suited to the production of a uniformly coated electrical insulating sheet because a coating liquid can be applied over the surface of the electrical insulating sheet in a state where uneven coating is eliminated, or where uneven coating is minimized, by adjusting the electric balance between the coating liquid and the electrical insulating sheet to be coated with the coating liquid. Such sheets to be coated with a coating liquid according to the invention include sheet-like materials such as plastic film, web of paper etc., silicon wafer, and glass base plate.

The invention claimed is:

1. A coating apparatus to apply a coating liquid on a first surface of an electrical insulating sheet traveling in a predetermined traveling direction which comprises:
   a sheet charging apparatus that supplies a charge to the first surface; and
   a first surface coating liquid supply apparatus that is provided downstream in the traveling direction from the sheet charging apparatus to supply the coating liquid to the first surface,
   wherein the sheet charging apparatus supplies the first surface with a charge having the same polarity as that of the coating liquid while the coating liquid is supplied to the first surface from the first surface coating liquid supply apparatus, and
   wherein a second surface coating liquid supply apparatus is provided upstream in the traveling direction from the first surface coating liquid supply apparatus and a coating liquid having a volume resistivity of $10^9$ [Ω·cm] or less is supplied from the second surface coating liquid supply apparatus to a second surface of the electrical insulating sheet.

2. A coating apparatus to apply a coating liquid on a first surface of an electrical insulating sheet traveling in a predetermined traveling direction which comprises:
   a first surface coating liquid supply apparatus that supplies the coating liquid to the first surface; and
   a coating liquid charging apparatus that supplies a charge to the coating liquid before being supplied to the first surface,
   wherein the coating liquid charging apparatus supplies the coating liquid with a charge having the same polarity as that of the first surface while the coating liquid is being supplied to the first surface from the first surface coating liquid supply apparatus, and
   wherein a second surface coating liquid supply apparatus is provided upstream in the traveling direction from the first surface coating liquid supply apparatus and a coating liquid having a volume resistivity of $10^9$ [Ω·cm] or less is supplied from the second surface coating liquid supply apparatus to a second surface of the electrical insulating sheet.

3. A coating apparatus to apply a coating liquid on a first surface of an electrical insulating sheet traveling in a predetermined traveling direction which comprises:
   a sheet charging apparatus to supply a charge having a predetermined polarity to the electrical insulating sheet;
   a first surface coating liquid supply apparatus that supplies the coating liquid to the first surface:
   and a coating liquid charging apparatus that supplies a charge having the same polarity as the predetermined polarity to the coating liquid before the coating liquid is supplied to the first surface, and
   wherein a second surface coating liquid supply apparatus is provided upstream in the traveling direction from the first surface coating liquid supply apparatus and a coating liquid having a volume resistivity of $10^9$ [Ω·cm] or less is supplied from the second surface coating liquid supply apparatus to a second surface of the electrical insulating sheet.

4. A coating apparatus according to any one of claims 1 to 3, wherein a second surface coating liquid supply apparatus is provided upstream in the traveling direction from the first surface coating liquid supply apparatus and a water-containing coating liquid is supplied from the second surface coating liquid supply apparatus to a second surface of the electrical insulating sheet.

5. A coating apparatus according to any one of claims 1 to 3, wherein a first surface coating layer smoothing apparatus is provided downstream in the traveling direction from the first surface coating liquid supply apparatus to smooth out the coating liquid supplied to the first surface from the first surface coating liquid supply apparatus for forming a coating layer having a predetermined coating thickness.

6. A coating apparatus according to claim 5, wherein the first surface coating layer smoothing apparatus is a coating layer smoothing apparatus comprising a coating bar system, a gravure roll coater system or a die system.

7. A coating apparatus according to claim 6, wherein the first surface is defined as the upper surface in the direction of the gravitational force, the coating liquid is supplied in the direction at right angles to both the traveling direction and the normal to the electrical insulating sheet to the first surface from the first surface coating liquid supply apparatus, and the first surface coating layer smoothing apparatus is the coating layer smoothing apparatus comprising the coating bar system.

8. A coating apparatus according to claim 1 or 3, wherein the sheet charging apparatus has at least one charging unit, the charging unit includes a first electrode unit provided in the side of the first surface of the electrical insulating sheet and a second electrode unit provided in the side of a second surface of the electrical insulating sheet, both of which are positioned on opposite sides of the electrical insulating sheet, the first electrode unit has a first ion generation electrode, and the second electrode unit has a second ion generation electrode, and wherein the electricity applied to the first ion generation electrode and that to the second ion generation electrode are direct currents having substantially opposite polarities to each other.

9. A coating apparatus according to claim 8, wherein the first electrode unit has a first shield electrode having an opening located proximate to the first ion generation electrode and the second electrode unit has a second shield electrode having an opening located proximate to the second ion generation electrode.

10. A coating apparatus according to any one of claims 1 to 3, wherein an electrical insulating sheet static elimination apparatus comprising at least two static eliminating units is provided with a distance in traveling direction between them downstream in the traveling direction from the coating apparatus, each of the static eliminating units includes a third electrode unit provided in the side of the first surface of the electrical insulating sheet and a fourth electrode unit provided in the side of the second surface of the electrical insulating sheet, both of which are positioned on opposite sides of the electrical insulting sheet, the third electrode unit has a third ion generation electrode and a third shield electrode having an opening proximate to the tip of the third ion generation electrode, and the fourth electrode unit has a fourth ion generation electrode and a fourth shield electrode having an opening proximate to the tip of the fourth ion generation electrode, and wherein the electricity applied to the third ion generation electrode and that to the fourth ion generation electrode are alternating currents having substantially opposite polarities to each other.

11. A coating apparatus according to claim 2 or 3, wherein the first surface coating liquid supply apparatus includes a storage tank that stores the coating liquid, a discharging means that discharges the coating liquid to the first surface, a pump that supplies the coating liquid from the storage tank to the discharging means, and a coating liquid supply pipe that conveys the coating liquid between the storage tank, the discharging means and the pump, and wherein the coating liquid supply pipe is applied a potential having the opposite polarity to that of the first surface when the coating liquid is being supplied to the first surface.

12. A method for producing an electrical insulating sheet having a coated film which comprises:

applying a coating liquid on a first surface of an electrical insulating sheet traveling in a predetermined traveling direction and forming a coated film on the first surface which comprises the coating liquid applied on the first surface, wherein a polarity of the first surface and a polarity of the coating liquid are adjusted in the same polarity when the coating liquid is being applied on the first surface, and wherein a coating liquid having a volume resistivity of $10^9$ [$\Omega \cdot cm$] or less is applied to a second surface of the electrical insulating sheet before the coating liquid is applied on the first surface.

13. A method for producing an electrical insulating sheet having a coated film which comprises:

applying a coating liquid on a first surface of an electrical insulating sheet traveling in a predetermined traveling direction and forming a coated film on the first surface which comprises the coating liquid applied on the first surface, wherein charging the first surface with the same polarity as that of the coating liquid before the coating liquid is applied on the first surface, and wherein a coating liquid having a volume resistivity of $10^9$ [$\Omega \cdot cm$] or less is applied to a second surface of the electrical insulating sheet before the coating liquid is applied on the first surface.

14. A method for producing an electrical insulating sheet having a coated film which comprises:

applying a coating liquid on a first surface of an electrical insulating sheet traveling in a predetermined traveling direction and forming a coated film on the first surface which comprises the coating liquid applied on the first surface, wherein charging the coating liquid with the same polarity as that of the first surface before the coating liquid is applied on the first surface, and wherein a coating liquid having a volume resistivity of $10^9$ [$\Omega \cdot cm$] or less is applied to a second surface of the electrical insulating sheet before the coating liquid is applied on the first surface.

15. A method for producing an electrical insulating sheet having a coated film which comprises:

applying a coating liquid on a first surface of an electrical insulating sheet traveling in the predetermined traveling direction and forming a coated film on the first surface which comprises the coating liquid applied on the first surface, wherein charging the coating liquid and the first surface respectively with the same polarity before the coating liquid is applied on the first surface, and wherein a coating liquid having a volume resistivity of $10^9$ [$\Omega \cdot cm$] or less is applied to a second surface of the electrical insulating sheet before the coating liquid is applied on the first surface.

16. A method according to any one of claims 12 to 15, wherein a water-containing coating liquid is applied on a second surface of the electrical insulating sheet before the coating liquid is applied on the first surface.

17. A method according to any one of claims 12 to 15, wherein an aerial potential of the electrical insulating sheet is caused to be the same as that of the coating liquid.

18. A method according to any one of claims 12 to 15, wherein a second surface of the electrical insulating sheet is charged with the opposite polarity to that of the first surface.

19. A method according to any one of claims 12 to 15, wherein one or more charging units are provided for the electrical insulating sheet, each charging unit includes a first ion generation electrode provided in the side of the first surface of the electrical insulating sheet and a second ion generation electrode provided in the side of a second surface of the electrical insulating sheet, both of which are provided on the opposite sides of the electrical insulating sheet in the direction of the normal thereto, wherein the electrical insulating sheet is charged by applying a first ion cloud, which is unipolar with its polarity being invariable with time, to the electrical insulating sheet from the first surface side while applying a second ion cloud, which is unipolar with its polarity being substantially opposite to that of the first ion cloud, from the second surface side, simultaneously with the application of the first ion cloud, and the application of ion clouds is achieved by applying a direct current that is invariable with time to the first and second ion generation electrodes.

20. A method according to any one of claims 12 to 15, wherein the first surface is subjected to static elimination downstream in the moving direction after the coating liquid has been applied on the electrical insulating sheet.

21. A method according to claim 20, wherein at least two static eliminating units are provided for the electrical insulating sheet, with a distance in the traveling direction, each static eliminating unit comprises a third ion generation electrode provided in the side of the first surface of the electrical insulating sheet and a fourth ion generation electrode provided in the side of a second surface of the electrical insulating sheet, both of which are provided on the opposite sides of the electrical insulating sheet in the direction of the normal thereto, wherein the electrical insulating sheet is charged by applying a first ion cloud, which is unipolar with its polarity varying with time to the electrical insulating sheet from the first surface side while a second ion cloud, which is unipolar with its polarity being substantially opposite to that of the first ion cloud, from the second surface side, simultaneously with the application of the first ion cloud, and the application of ion clouds is achieved by applying to the third and fourth ion generation electrodes an alternating current whose polarity smoothly changes with time.

* * * * *